US012609125B2

(12) United States Patent
Torcoli et al.

(10) Patent No.: US 12,609,125 B2
(45) Date of Patent: Apr. 21, 2026

(54) SIGNAL-ADAPTIVE REMIXING OF SEPARATED AUDIO SOURCES

(71) Applicant: Fraunhofer-Gesellschaft zur Förderung der angewandten Forschung e.V., Munich (DE)

(72) Inventors: Matteo Torcoli, Erlangen (DE); Jouni Paulus, Erlangen (DE); Christian Simon, Erlangen (DE); Harald Fuchs, Erlangen (DE); Christian Uhle, Erlangen (DE); Thomas Mayenfels, Erlangen (DE); Andreas Turnwald, Nuremberg (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 291 days.

(21) Appl. No.: 18/452,084

(22) Filed: Aug. 18, 2023

(65) Prior Publication Data

US 2023/0395079 A1 Dec. 7, 2023

Related U.S. Application Data

(63) Continuation of application No. PCT/EP2022/054432, filed on Feb. 22, 2022.

(30) Foreign Application Priority Data

Feb. 22, 2021 (DE) ......................... 102021201668.5

(51) Int. Cl.
*G10L 19/00* (2013.01)

(52) U.S. Cl.
CPC ................................... *G10L 19/00* (2013.01)

(58) Field of Classification Search
USPC ........................................................ 704/503
See application file for complete search history.

(56) References Cited

U.S. PATENT DOCUMENTS 10,382,880 B2 * 8/2019 Davidson ................ H04S 7/304
10,387,920 B2 * 8/2019 Tinsman ............ G06Q 30/0275
(Continued)

FOREIGN PATENT DOCUMENTS

WO 2015/150066 A1 10/2015
WO 2019/229199 A1 12/2019
WO 2020/120754 A1 6/2020

OTHER PUBLICATIONS

International Search Report and Written Opinion issued in application No. PCT/EP2022/054432.
(Continued)

*Primary Examiner* — Bharatkumar S Shah
(74) *Attorney, Agent, or Firm* — McClure, Qualey & Rodack, LLP

(57) ABSTRACT

There are described techniques (e.g. methods and systems) for signal-adaptive remixing of separated audio sources. A system may comprise: a source separation block estimating, from an input signal, a target signal and at least one residual signal to be subsequently remixed according to at least one remixing gain variable along the discrete succession; a control block configured to determine, for a determined current time instant or time slot, metrics on the target signal; and a temporal context block determining temporal context information based on metrics on the target signal. The control block may generate a remixing gain associated to the determined current time instant or time slot by considering: the metrics in the determined current time instant or time slot; and the temporal context information.

29 Claims, 7 Drawing Sheets

(56) References Cited

U.S. PATENT DOCUMENTS

| | | | | |
|---|---|---|---|---|
| 10,387,949 | B2 * | 8/2019 | Huber | G06Q 30/0269 |
| 2013/0108096 | A1 * | 5/2013 | Fitz | H04R 25/554 381/320 |
| 2020/0322743 | A1 * | 10/2020 | Cengarle | H04S 3/008 |
| 2021/0329323 | A1 * | 10/2021 | Taylor | H04N 21/458 |
| 2021/0358506 | A1 * | 11/2021 | Wang | H04S 7/303 |
| 2023/0395079 | A1 * | 12/2023 | Torcoli | G10L 19/00 |
| 2024/0137723 | A1 * | 4/2024 | Laitinen | G10L 21/0272 |
| 2024/0185864 | A1 * | 6/2024 | Hirvonen | G10L 19/0204 |

OTHER PUBLICATIONS

Simon, C., et al.; "MPEG-H Audio for Improving Accessibility in Broad-casting and Streaming;" ; Sep. 2019; pp. 1-11.

Paulus, J., et al.; "Source separation for enabling dialogue enhancement in object-based broadcast with MPEG-H;" Journal of the Audio Engineering Society, Special Issue on Object-Based Audio; vol. 67; No. 7/8; Jul./Aug. 2019; pp. 510-521.

Torcoli, M., et al.; "Preferred levels for background ducking to produce esthetically pleasing audio for tv with clear speech;" Journal of the Audio Engineering Society; vol. 67; No. 12; Dec. 2019; pp. 1003-1011.

Geary, D., et al.; "Loudness differences for voiceover—voice audio in tv and streaming;" Journal of the Audio Engineering Society; vol. 68; No. 11; Nov. 2020; pp. 810-818 http://dx.doi.org/10.17743/jaes.2020.0022.

Hennequin, R., et al.; "Spleeter: a fast and efficient music source separation tool with pre-trained models;" Journal of Open Source Software; vol. 5; No. 50; 2020; pp. 1-4 https://doi.org/10.21105/joss.02154.

Torcoli, M., et al.; "The Adjustment/Satisfaction Test (A/ST) for the Subjective Evaluation of Dialogue Enhancement;" Proc. of 143rd Audio Engineering Society Convention; Oct. 2017; pp. 1-9.

Wang, D.L., et al.; "Supervised speech separation based on deep learning: An over-view;" IEEE/ACM Transactions on Audio, Speech, and Language Processing; vol. 26; No. 10; Oct. 2018; pp. 1702-1726.

Rafii, Z., et al.; "An overview of lead and accompaniment separation in music;" IEEE/ACM Transactions on Audio, Speech, and Language Processing; vol. 26; No. 8; Aug. 2018; pp. 1307-1335.

ITU-R BS.1770-4; "Algorithms to measure audio programme loudness and true-peak audio level;" Oct. 2015; pp. 1-25.

Moore, B.C.J., et al.; "A model for the prediction of thresholds, loudness, and partial loudness;" J. Audio Eng. Soc; vol. 45; No. 4; Feb. 1997; pp. 224-240, 1997 http://www.aes.org/e-lib/browse.cfm?elib=10272.

Uhle, C., et al.; "Controlling the perceived sound quality for dialogue enhancement with deep learning;" Proc. of IEEE International Conference on Acoustics, Speech, and Signal Processing (ICASSP); 2020; pp. 51-55.

Torcoli., M .; "An improved measure of musical noise based on spectral kurtosis;" 2019 IEEE Workshop on Applications of Signal Processing to Audio and Acoustics (WASPAA); Oct. 2019; pp. 1-5.

Woodruff, J., et al.; "Remixing stereo music with score-in-formed source separation;" ISMIR; 2006; pp. 314-319.

Wierstorf, H., et al.; "Perceptual evaluation of source separation for remixing music;" Audio Engineering Society Convention 143. Audio Engineering Society; Oct. 2017; pp. 1-9.

Torcoli, M., et al.; "The Adjustment/Satisfaction Test (A/ST) for the Evaluation of Personalization in Broadcast Services and Its Application to Dialogue Enhancement;" IEEE Transactions on Broadcasting; vol. 64; No. 2; Oct. 2017; pp. 524-538.

Master, A.S., et al.; "Dialog en-hancement via spatio-level filtering and classification;" Audio Engineering Society Convention 149. Audio Engineering Society; Oct. 2020; pp. 1-14.

* cited by examiner

SIGNAL-ADAPTIVE REMIXING OF SEPARATED AUDIO SOURCES

CROSS-REFERENCE TO RELATED APPLICATIONS

This application is a continuation of copending International Application No. PCT/EP2022/054432, filed Feb. 21, 2022, which is incorporated herein by reference in its entirety, and additionally claims priority from German Application No 102021201668.5, filed Feb. 22, 2021, which is also incorporated herein by reference in its entirety.

There are provided techniques for audio signal processing, such as for signal-adaptive remixing of separated audio sources and for providing gains therefor.

BACKGROUND OF THE INVENTION

An aim to process an input signal which is a mixture of multiple sources and to create an output mixture in which the relative level of the sources is modified. One example is to make the speech in a movie audio track clearer, louder, and more intelligible.

The proposed method may apply source separation to estimate the sources and remix these estimates by applying automatically generated time-varying, signal-adaptive gains. The remixing aims to fulfill a time-varying criterion concerning the separated sources and their relationship in the output mix. The output mixture has to be smooth and esthetically pleasing. For this purpose, a temporal context is taken into consideration during the generation of the remixing gains so to avoid abrupt and unaesthetic changes.

An envisioned application is to enable object-based audio personalization, e.g., based on MPEG-H Audio [1, 2]. Based on MPEG Unified Speech and Audio Coding, the MPEG-H Audio standard offers many extensions for use in the context of immersive 3D audio, such as coding and rendering of multi-channel and object signals, transmission of object metadata, the compressed transmission of (speaker layout agnostic) object positions and trajectories, and it allows for personalization and user interactivity on the decoder side that is enabled and controlled by object metadata. The underlying main ideas of the new codec are to provide suitable means for an immersive experience, for universal delivery, and for personal interactivity.

Personal interactivity is a particularly demanded use case, for example, for personalizing the audio track in movies and TV programs. In fact, it has been shown that the balance between the speech and the background signals is extremely personal [3, 4]. However, often, only a mono, stereo, or multi-channel mix of all sources is available instead of sub-mixes of the sources. Ways to automatically generate alternative mixes with different relative levels starting from the available mix are desired. The resulting mix has to be of high sound quality and esthetically pleasing. The system proposed in this report and shown in FIG. 1 can be applied for this purpose. In the example use case of object-based audio, the modules of FIG. 1 are located in different devices and are run in different points in time. For example, the source separation module 110 and the control module 120 and/or the temporal context module 130 can be located on the encoder/server side, while the remixing module is located at the decoder/end-device side.

Alternative application scenarios might involve traditional broadcasting and streaming services. In these, full personalization is usually not available (or needed), but an alternative audio track (generated as described in this report) can be generated offline and offered by the broadcasting/streaming provider. In a further envisioned application, the alternative audio track could be generated directly by the end-device. In other words, all modules are placed in the end-device.

Typically, constant gains are applied on the estimated target source and/or on the residual sources, e.g., in order to modify the SNR (signal to noise ratio) during the remixing. The SNR may be the ratio of the target signal to the at least one residual signal. These constant (over time) gains can be set by the final user, or they can be pre-defined and fixed, or they aim to optimize a global criterion. However constant gains and a global criterion have several problems:

1. The SNR (e.g. a ratio comparing the level of the target signal, e.g. foreground signal, with the level of the at least one residual signal, e.g. background signal) or the chosen criterion is optimized globally, but not locally, e.g., no attention to SNR(t).
2. The resulting remix could be esthetically not pleasing, especially during long passages where one of estimated source is very quiet or silent, e.g., where SNR(t) is very large or very small.
3. The level of the audio sources is changed also when not necessary (e.g., SNR(t) is locally high enough), possibly losing the envelopment and the information that the attenuated sources carry.
4. Artifacts, distortions, and coloration introduced by an imperfect separation are introduced also when not necessary. E.g., SNR(t) is locally high enough, still the levels are changed and separation artifacts are unmasked.
5. Similar problems are encountered when criteria other than the SNR are optimized globally and not locally, e.g., a loudness difference or a sound quality metric.

An alternative to constant gains, well-known among audio engineers, could be side-chain ducking, i.e., controlling the time-varying level of one (ducked) signal based on the absolute level of another ducking signal. The ducked and the ducking signals could be the outputs from the separation. This approach is also suboptimal because the amount of ducking is only based on the level of one signal and not on properties relative to all signals involved. Moreover, side-chain ducking is not robust against the unavoidable errors (e.g., leaking components) in the source separation module. Furthermore, a traditional side-chain ducking applies a stronger attenuation on the ducked signal, when the level of the ducking signal is higher. This may have a benefit in keeping the overall level of the resulting mixture approximately constant, but is not useful for, e.g., guaranteeing a level of intelligibility of a speech signal when mixed on top of a background signal. For the intelligibility, the attenuation needs to be stronger when the ducking signal is softer, so that it becomes better audible in the mixture.

1. SUMMARY

According to an embodiment, a system for processing audio signals may have: a source separation block configured to estimate, from an input signal evolving in time along a discrete succession of time instants or time slots, a target signal and at least one residual signal to be subsequently remixed according to at least one remixing gain variable along the discrete succession; a control block configured to determine, for a determined current time instant or time slot, a first, relative metrics on the target signal, in the determined current time instant or time slot, wherein the first, relative metrics compares a level of the target signal with a level of the at least one residual signal or the input signal, in the determined current time instant or time slot; and a temporal context block configured to determine temporal context information based on a second, relative metrics in at least one future and/or past time instant or time slot, the second, relative metrics comparing a level of the target signal with a level of the input signal or the at least one residual signal, in the at least one future and/or past time instant or time slot, the at least one future time instant or time slot being, in the discrete succession, after the determined current time instant or time slot, and the past time instant or time slot being, in the discrete succession, before the determined current time instant or time slot, wherein the control block is configured to generate at least one remixing gain associated to the determined current time instant or time slot based on: the first, relative metrics in the determined current time instant or time slot; and the temporal context information.

According to another embodiment, a method for processing audio signals may have: a source separation step obtaining, from an input signal evolving in time along a discrete succession of time instants or time slots, a target signal and at least one residual signal to be subsequently remixed according to at least one remixing gain variable along the discrete succession; a control step determining, for a determined current time instant or time slot, a first, relative metrics in the determined current time instant or time slot, wherein the first, relative metrics compares a level of the target signal with a level of the input signal, or the at least one residual signal, in the determined current time instant or time slot; and a temporal context step determining temporal context information based on a second, relative metrics in at least one future and/or past time instant or time slot, the second, relative metrics comparing a level of the target signal with a level of the input signal or the at least one residual signal in the at least one future and/or past time instant or time slot, the at least one future time instant or time slot being, in the discrete succession, after the determined current time instant or time slot, and the past time instant or time slot being, in the discrete succession, before the determined current time instant or time slot, the method including generating at least one remixing gain based on: the first, relative metrics in the determined current time instant or time slot; and the temporal context information.

Another embodiment may have a non-transitory digital storage medium having a computer program stored thereon to perform the inventive method when said computer program is run by a computer.

According to an aspect, there is provided a system for processing audio signals, comprising:

- a source separation block configured to estimate, from an input signal evolving in time along a discrete succession of time instants or time slots, a target signal and at least one residual signal to be subsequently remixed according to at least one remixing gain variable along the discrete succession;
- a control block configured to determine, for a determined current time instant or time slot, at least one metrics on the target signal, or a processed version thereof, in the determined current time instant or time slot, wherein the at least one metrics includes at least one relative metrics between the target signal, or a processed version thereof, and the input signal, or a processed version thereof, or the at least one residual signal, or a processed version thereof, in the determined current time instant or time slot; and
- a temporal context block configured to determine temporal context information based on at least one metrics on the target signal, or a processed version thereof, in at least one future and/or past time instant or time slot, the at least one future time instant or time slot being, in the discrete succession, after the determined current time instant or time slot, and the past time instant or time slot being, in the discrete succession, before the determined current time instant or time slot, wherein the control block is configured to generate at least one remixing gain associated to the determined current time instant or time slot by considering:

- the at least one metrics in the determined current time instant or time slot; and
- the temporal context information.

The system may be such that the temporal context information includes at least one metrics on the target signal, or a processed version thereof, in the at least one determined future and/or past time instant or time slot.

The system may be such that the temporal context information includes information on at least one previously obtained remixing gain.

The system may be such that the temporal context information includes information on at least one rough remixing gain obtained for the at least one determined future and/or past time instant or time slot.

The system may be such that there are defined at least one first remixing criterion and one second remixing criterion for generating at least one rough remixing gain. At least one criterion condition may perform a discrimination between using the first remixing criterion and using the second remixing criterion at each time instant or time slot, so that, based on the at least one criterion condition, each time instant or time slot is associated to one of the at least one first remixing criterion and second remixing criterion. The at least one criterion condition may be a condition on the at least one metrics on at least the target signal, or a processed version thereof, at the determined current time instant or time slot, or on information obtained from the at least one metrics on the at least the target signal or a processed version thereof, so that the determined current time instant or time slot is associated to one of the at least one first remixing criterion and one second remixing criterion based on the metrics on the target signal, or a processed version thereof, in the determined current time instant or time slot, wherein the system is further configured to obtain the at least one remixing gain for the determined current time slot or time instant by considering temporal context information so as to deviate, from the at least one rough remixing gain, based on a deviation obtained from the temporal context information.

The at least one criterion condition may include a condition (e.g. clearance condition) on e.g. at least one relative metrics (e.g. $SNR_i$) on the current determined time instant or time slot being compared to a threshold (e.g. target clearance), so that the first remixing criterion (e.g. implying high rough gain and/or unitary gain in some examples) is assigned to the current determined time instant or time slot when the at least one relative metrics is over the threshold (e.g. target clearance), and the second criterion (e.g. implying lower rough gain than the first criterion and/or a rough gain which permits to achieve the target clearance between the target signal and the background signal) is assigned to the current determined time instant or time slot when the at least one relative metrics is below the threshold (e.g. target clearance).

The at least one criterion condition may include a condition (e.g. gating condition, also known as intensity condition) on e.g. at least one absolute metrics (e.g. intensity) on the current determined time instant or time slot being compared to a threshold (e.g. intensity threshold), so that the first remixing criterion (e.g. implying high rough gain or unitary gain in some examples) is assigned to the current determined time instant or time slot when the at least one absolute metrics is below the threshold (e.g. intensity threshold), and the second remixing criterion (e.g. implying lower rough gain than the second criterion and/or a rough gain which permits to achieve the target clearance between the target signal and the background signal) is assigned to the current determined time instant or time slot when the at least one absolute metrics is over the threshold (e.g. intensity threshold).

According to an aspect, the criterion condition may be based on an "OR" condition of multiple conditions, e.g. an "OR" condition of the intensity condition (e.g. gating condition) and of the clearance condition, so that the first criterion is assigned to the current determined time instant or time slot when at least one of the intensity condition (intensity lower than the intensity threshold) and the clearance condition (intensity higher than the target clearance) is verified. Otherwise (i.e. if neither of the intensity condition and the clearance condition is verified), the second criterion is assigned to the current determined time instant or time slot.

For example, we may have (from the so-called formula (5) below):

$$\begin{cases} \text{first remixing criterion, e.g. } g(t) = 1, \text{ if } SNR_{in}(t) > C \text{ or } \hat{I}_s < G \\ \text{second remixing criterion, e.g. } g(t) = \sqrt{\dfrac{SNR_{in}(t)}{C}}, \text{ otherwise} \end{cases}$$

with C being the target clearance and G being the intensity threshold, g(t) being the rough gain, t being the current determined time instant or time slot, $SNR_{in}(t)$ being the signal to noise ratio in input (or more in general a relative metrics) between the target signal (or processed version thereof) and the residual signal (background signal) or processed version thereof, or the input signal (or processed version thereof), and $\hat{I}_s$ being the intensity (or more in general an absolute metrics) of the target signal (or processed version thereof).

The system may be configured to deviate from the at least one rough remixing gain by correcting the at least one rough remixing gain by an amount associated to a previously obtained at least one remixing gain for a time instant or time slot preceding the determined current time instant or time slot.

The system may be configured to deviate from the at least one rough remixing gain by correcting the at least one rough remixing gain for a gain amount associated to a previously obtained at least one remixing gain for a time instant or time slot preceding the determined current time instant or time slot subjected to the fulfilment of a deviation condition based on the temporal context information, wherein the temporal context information includes information on rough remixing gains already obtained for time instants or time slots following the determined time instant or time slot. The deviation condition may be fulfilled, in some aspects, when a predetermined number of rough remixing gains already obtained for time instants or time slots following the determined time instant or time slot are associated to a remixing criterion which is different from the remixing criterion of the current determined time instant or time slot or of the time instant or time slot preceding the current determined time instant or time slot. If the deviation condition is not fulfilled, the at least one remixing gain for the determined current time instant or time slot may be maintained the same of the at least one remixing gain for the current determined time instant or time slot or the time instant or time slot preceding the determined current time instant or time slot.

The system may be further configured to correct the at least one rough remixing gain through a linear combination of the at least one rough remixing gain (g(t)) and the previously obtained at least one remixing gain ($g_{smooth}(t)$).

The system may be such that the linear combination is based on a predefined parameter τ comprised between 0 and 1, wherein the first predefined parameter (e.g. τ) scales the at least one rough remixing gain and a second predefined parameter (e.g. 1−τ) between 0 and 1 scales the previously obtained at least one remixing gain, wherein the sum between the first predefined parameter and the second predefined parameter is 1.

The system may be such that the parameter τ is a first predefined parameter for a deviation from the first remixing criterion to the second remixing criterion and a second predefined parameter, different from the first predefined parameter, for a deviation from the second remixing criterion to the first remixing criterion.

The system may be such that the at least one criterion condition includes a condition on at least the relative metrics at the determined current time instant or time slot, so that if the relative metrics between the target signal, or a processed version thereof, and the at least one residual signal, or a processed version thereof, or input signal, or a processed version thereof, at the determined current time instant or time slot is greater than a predetermined relative threshold, then the determined current time slot or time instant is associated to the first remixing criterion; and if the relative metrics between the target signal, or a processed version thereof, and the at least one residual signal at the determined current time instant or time slot is smaller than the predetermined relative threshold, then the determined current time slot or time instant is associated to the second remixing criterion. The first remixing criterion may adopt a first ratio between: the rough remixing gain associated to the target signal, or a processed version thereof; and the rough remixing gain associated to the input signal, or a processed version thereof, or the at least one residual signal, or a processed version thereof; the second remixing criterion adopts a second ratio between: the rough remixing gain associated to the target signal, or a processed version thereof; the rough remixing gain associated to the input signal, or a processed version thereof, or the at least one residual signal, or a processed version thereof. The second ratio may be higher than the first ratio. The deviation may include gradually moving the ratio between the remixing gain associated to the target signal, or a processed version thereof, and the remixing gain associated to the at least one residual signal, or a processed version thereof, or the input signal or a processed version thereof, from the first ratio to the second ratio, or vice versa.

The system may be such that the at least one criterion condition includes a condition on at least the absolute metrics at the determined current time instant or time slot, so that if the absolute metrics on the target signal, or a processed version thereof, at the determined current time instant or time slot is smaller than a predetermined absolute threshold, then the determined current time slot or time instant is associated to the first remixing criterion; and if the absolute metrics on the target signal, or a processed version thereof, at the determined current time instant or time slot is greater than the predetermined absolute threshold, then the determined current time slot or time instant is associated to the second remixing criterion. The first remixing criterion may adopt a first ratio between: the rough remixing gain associated to the target signal, or a processed version thereof; and the rough remixing gain associated to the input signal, or a processed version thereof, or the at least one residual signal or a processed version thereof. The second remixing criterion adopts a second ratio between: the rough remixing gain associated to the target signal, or a processed version thereof; the rough remixing gain associated to the input signal, or a processed version thereof, or the at least one residual signal, or a processed version thereof. The second ratio may be higher than the first ratio. The deviation includes gradually moving the ratio between the remixing gain associated to the target signal, or a processed version thereof, and the remixing gain associated to the at least one residual signal, or a processed version thereof, or the input signal or a processed version thereof, from the first ratio to the second ratio, or vice versa.

The system may be such that the deviation condition is fulfilled when a predetermined number of rough remixing gains already obtained for time instants or time slots in a time window following the determined time instant or time slot is associated to a remixing criterion which is different from the remixing criterion associated to the current determined time instant or time slot or to the time instant or time slot preceding the current determined time instant or time slot. If the deviation condition is not fulfilled, the at least one remixing gain for the determined current time instant or time slot is maintained the same of the at least one remixing gain for a time instant or time slot preceding the determined current time instant or time slot.

The system may be such that the deviation condition is fulfilled when a predetermined number of rough remixing gains already obtained for time instants or time slots in a time window following the determined time instant or time slot is associated to a remixing criterion which is different from the remixing criterion associated to a time instant or time slot preceding the time instants or time slots in the time window following the determined time instant or time slot, such as one of the two time instants or time slots immediately preceding the time instants or time slots in the time window following the determined time instant or time slot (e.g. one of the current determined time instant or time slot and the time instant or time slot immediately preceding the current determined time instant or time slot). If the deviation condition is not fulfilled, the at least one remixing gain for the determined current time instant or time slot is maintained the same of the at least one remixing gain for a time instant or time slot preceding the determined current time instant or time slot.

The system may be such that the deviation condition is not fulfilled at least when the rough remixing gain associated to the determined current time instant or slot is associated to a remixing criterion different from the remixing criterion associated to the current determined time instant or time slot or time instant or time slot preceding the current determined time instant or time slot. In that case the at least one remixing gain for the determined current time instant or time slot is maintained the same of the at least one remixing gain for the current determined time instant or time slot or the time instant or time slot preceding the determined current time instant or time slot.

The system may be such that the deviation condition is not fulfilled at least when the rough remixing gain associated to the determined current time instant or slot is associated to a remixing criterion different from the remixing criterion associated to a time instant or time slot preceding the time instants or time slots in the time window following the determined time instant or time slot, such as one of the two time instants or time slots immediately preceding the time instants or time slots in the time window following the determined time instant or time slot (e.g. one of the current determined time instant or time slot and the time instant or time slot preceding the current determined time instant or time slot). In that case the at least one remixing gain for the determined current time instant or time slot is maintained the same of the at least one remixing gain for time instant or time slot preceding the time instants or time slots in the time window following the determined time instant or time slot, such as one of the two time instants or time slots immediately preceding the time instants or time slots in the time window following the determined time instant or time slot (i.e. one of the current determined time instant or time slot and the time instant or time slot preceding the current determined time instant or time slot).

The system may be such that the second remixing criterion is dominant over the first remixing criterion, and the deviation condition is evaluated when the time instant or time slot preceding the time instants or time slots in the time window following the determined time instant or time slot (such as one of the two time instants or time slots immediately preceding the time instants or time slots in the time window following the determined time instant or time slot, e.g. one of the current determined time instant or time slot and the time instant or time slot preceding the current determined time instant or time slot) is associated to the second remixing criterion, while the evaluation of the deviation condition is deactivated when the time instant or time slot preceding the time instants or time slots in the time window following the determined time instant or time slot (such as one of the two time instants or time slots immediately preceding the time instants or time slots in the time window following the determined time instant or time slot, e.g. one of the current determined time instant or time slot and the time instant or time slot preceding the current determined time instant or time slot) is associated to the first remixing criterion.

The system may be such that the second remixing criterion is dominant over the first remixing criterion, and the deviation condition is evaluated when the current determined time instant or time slot or the time instant or time slot preceding the current determined time instant or time slot is associated to the second remixing criterion, while the evaluation of the deviation condition is deactivated when the current determined time instant or time slot or the time instant or time slot preceding the current determined time instant or time slot is associated to the first remixing criterion.

The system may be configured to distinguish, based on the at least one metrics on the target signal or a processed version thereof, in the at least one determined current time instant, and on the temporal context information, between transitory time interval and non-transitory time intervals, so as to in the non-transitory time interval, assign the value of the at least one rough remixing gain according to the current remixing criterion to the at least one remixing gain; and to deviate from the at least one rough remixing gain according to the current remixing criterion in the transitory time intervals.

The system may be configured to associate, to the target signal or a processed version thereof, an activity information for each time instant or time slot which acknowledges whether, for each time instant or time slot, target signal, or the processed version thereof, is active or non-active based on the at least one metrics in each time instant or time slot, wherein the at least one criterion condition keeps into account the activity information.

The system may be such that the at least one future and/or past time instant or time slot is in a time window of predetermined time length.

The system may be such that the activity information is active for time instants or time slots for which the at least one absolute metrics, associated to a level or loudness of the target signal, or a processed version thereof, as being greater than an absolute predefined threshold and/or at least one relative metrics, comparing the target signal, or a processed version thereof, with the at least one residual signal, or a processed version thereof, or input signal, or a processed version thereof, is greater than a relative predefined threshold.

The system may be such that the activity information is additionally active for time instants or time slots within a time window in which the time instants or time slots have the at least one absolute metrics, associated to a level or loudness of the target signal, or a processed version thereof, smaller than the absolute predefined threshold and/or the at least one relative metrics, comparing the target signal, or a processed version thereof, with the at least one residual signal, or a processed version thereof, or input signal, or a processed version thereof, is smaller than the relative predefined threshold, but the time window has length smaller than a predetermined time threshold.

The system may be such that the activity information is negative for time instants or time slots within a time window in which the time instants or time slots have the at least one absolute metrics, associated to a level or loudness of the target signal, or a processed version thereof, smaller than the absolute predefined threshold and/or the at least one relative metrics, comparing the target signal, or a processed version thereof, with the at least one residual signal, or a processed version thereof, or input signal, or a processed version thereof, is smaller than the relative predefined threshold, and the time window has length greater than the predetermined time threshold.

The system may be configured to define the at least one gain for a plurality of consecutive time instants or time samples to gradually deviating from a first remixing criterion towards a second remixing criterion.

The system may be configured to perform, for the determined current time instant or time slot, a time averaging on a plurality of time instants or time slots which precede and/or follow the determined time instant, so as to obtain an average of the at least one metrics, e.g. along the plurality of time instants or time slots.

The system may be configured to reassign the same value of the target signal or a processed version thereof, and/or the input signal, or a processed version thereof, or the at least one residual signal, or a processed version thereof, as the obtained average.

The system may be configured to shift the at least one gain as obtained for each time instant or time step of the discrete succession of time instants or time slots by a predetermined number of time instants or time steps towards the past.

The system may further include a remixing block configured to apply, for the determined current time instant or time slot, the at least one gain and the at least one residual signal.

The system may be such that the signals (e.g. at least one of target signal, input signal, residual signal, etc.) is in the time domain.

The input signal, the target signal and the at least one residual signal may be in the frequency domain ins some aspects.

The at least one remixing gain may include different remixing gains for different frequency bands in some aspects.

The system may be such that the at least one metrics in the determined current time instant or time slot and the at least one metrics in the at least one determined future and/or past time instant or time slot is subdivided onto metrics for different frequency bands, so as to obtain the different remixing gains for different frequency bands.

The system may be such that the at least one metrics, for the determined current time instant or time slot and for the at least one future and/or past time instant or time slot, is weighted according to weighting coefficients which vary according to the frequency.

The system may further comprise a remixing block providing a remixed output signal in which the target signal, or a processed version thereof, and the at least one residual signal, or a processed version thereof, are mixed together according to the at least one gain.

The system may be configured to encode a bitstream encoding the target signal, or a processed version thereof, and the at least one residual signal, or a processed version thereof, or input signal, or a processed version thereof, and the at least one gain. The system may be configured to transmit the encoded bitstream.

The system may be such that

- the at least one relative metrics between the target signal, or a processed version thereof, and the input signal, or a processed version thereof, or the at least one residual signal, or a processed version thereof, in the determined current time instant or time slot includes:
  - a relative metrics comparing a level, or a measurement associated to a level, of the target signal, or a processed version thereof, with a level, or a measurement associated to a level, of the at least one residual signal or the input signal, or a processed version thereof; and/or
- the at least one relative metrics between the target signal, or a processed version thereof, and the input signal, or a processed version thereof, or the at least one residual signal, or a processed version thereof, in the at least one determined future and/or past time instant or time slot includes:
  - a relative metrics comparing a level, or a measurement associated to a level, of the target signal, or a processed version thereof, with a level, or a measurement associated to a level, of the input signal, or a processed version thereof, or the at least one residual signal, or a processed version thereof.

The system may be such that the at least one metrics on the target signal, or a processed version thereof, in the determined current time instant or time slot further includes:

- an absolute metrics associated to a level, or a measurement associated to a level, of the target signal, or a processed version thereof; and/or
- the at least one metrics on the target signal, or a processed version thereof, in the at least one future and/or past time instant or time slot further includes:
  - an absolute metrics associated to a level, or a measurement associated to a level, of the target signal, or a processed version thereof.

The system may be such that the at least one metrics on the target signal, or a processed version thereof, in the determined current time instant or time slot further includes:

an absolute metrics associated to a computational model of loudness, or a measurement associated to a computational model of loudness, of the target signal, or a processed version thereof; and/or the at least one metrics on the target signal, or a processed version thereof, in the at least one future and/or past time instant or time slot further includes:

an absolute metrics associated to a computational model of loudness, or a measurement associated to a computational model of loudness, of the target signal, or a processed version thereof.

In examples, the at least one gain may be obtained as (see also below in formula (12))

$$g_{smooth}(t) = \begin{cases} g_{smooth}(t-1), & \text{if } c_{hold}(t) > 0 \\ (1-\tau(t))g_{smooth}(t-1) + \tau(t)g(t), & \text{otherwise} \end{cases}.$$

where $c_{hold}(t)$ is a variable indicating the length of the still remaining time to keep the current gain value and it can be $c_{hold}(t)=0$ if $g_{smooth}(t-1)>g(t)$, otherwise $c_{hold}(t)=\max\{c_{hold}(t-1)-1, k_{min}(t)\}$, where $k_{min}(t)$ indicates the location of the minimum gain value within a window of $t_{holdahead}$ future values if this value is smaller than the current smoothed value, e.g., $k_{min}(t)=\arg\min\{g(t:t+t_{holdahead})\}$ if $\min\{g(t:t+t_{holdahead})\}<g_{smooth}(t-1)$, otherwise $k_{min}(t)=0$.

According to an aspect, there is provided a method for processing audio signals, comprising:

a source separation step obtaining, from an input signal evolving in time along a discrete succession of time instants or time slots, a target signal and at least one residual signal to be subsequently remixed according to at least one remixing gain variable along the discrete succession;

a control step determining, for a determined current time instant or time slot, at least one metrics on the target signal, or a processed version thereof, in the determined current time instant or time slot, wherein the at least one metrics includes at least one relative metrics between the target signal, or a processed version thereof, and the input signal, or a processed version thereof, or the at least one residual signal, or a processed version thereof, in the determined current time instant or time slot; and/or a temporal context step determining temporal context information based on at least one metrics on the target signal, or a processed version thereof, in at least one future and/or past time instant or time slot, the at least one future time instant or time slot being, in the discrete succession, after the determined current time instant or time slot, and the past time instant or time slot being, in the discrete succession, before the determined current time instant or time slot, the method including generating at least one remixing gain based on:

the at least one metrics in the determined current time instant or time slot; and the temporal context information.

According to an aspect, there is a provided non-transitory storage unit storing instructions which, when executed by a processor, cause the processor to perform the method above.

According to an aspect, there is provided a system for processing audio signals, comprising at least one processor to:

estimate, from an input signal evolving in time along a discrete succession of time instants or time slots, a target signal and at least one residual signal to be subsequently remixed according to at least one remixing gain variable along the discrete succession;

determine, for a determined current time instant or time slot, at least one metrics on the target signal, or a processed version thereof, in the determined current time instant or time slot, wherein the at least one metrics includes at least one relative metrics between the target signal, or a processed version thereof, and the input signal, or a processed version thereof, or the at least one residual signal, or a processed version thereof, in the determined current time instant or time slot; and determine temporal context information based on at least one metrics on the target signal, or a processed version thereof, in at least one future and/or past time instant or time slot, the at least one future time instant or time slot being, in the discrete succession, after the determined current time instant or time slot, and the past time instant or time slot being, in the discrete succession, before the determined current time instant or time slot, to generate at least one remixing gain associated to the determined current time instant or time slot by considering the at least one metrics in the determined current time instant or time slot; and the temporal context information.

2. FIGURES

Embodiments of the present invention will be detailed subsequently referring to the appended drawings, in which.

DETAILED DESCRIPTION OF THE INVENTION

Figure 1:
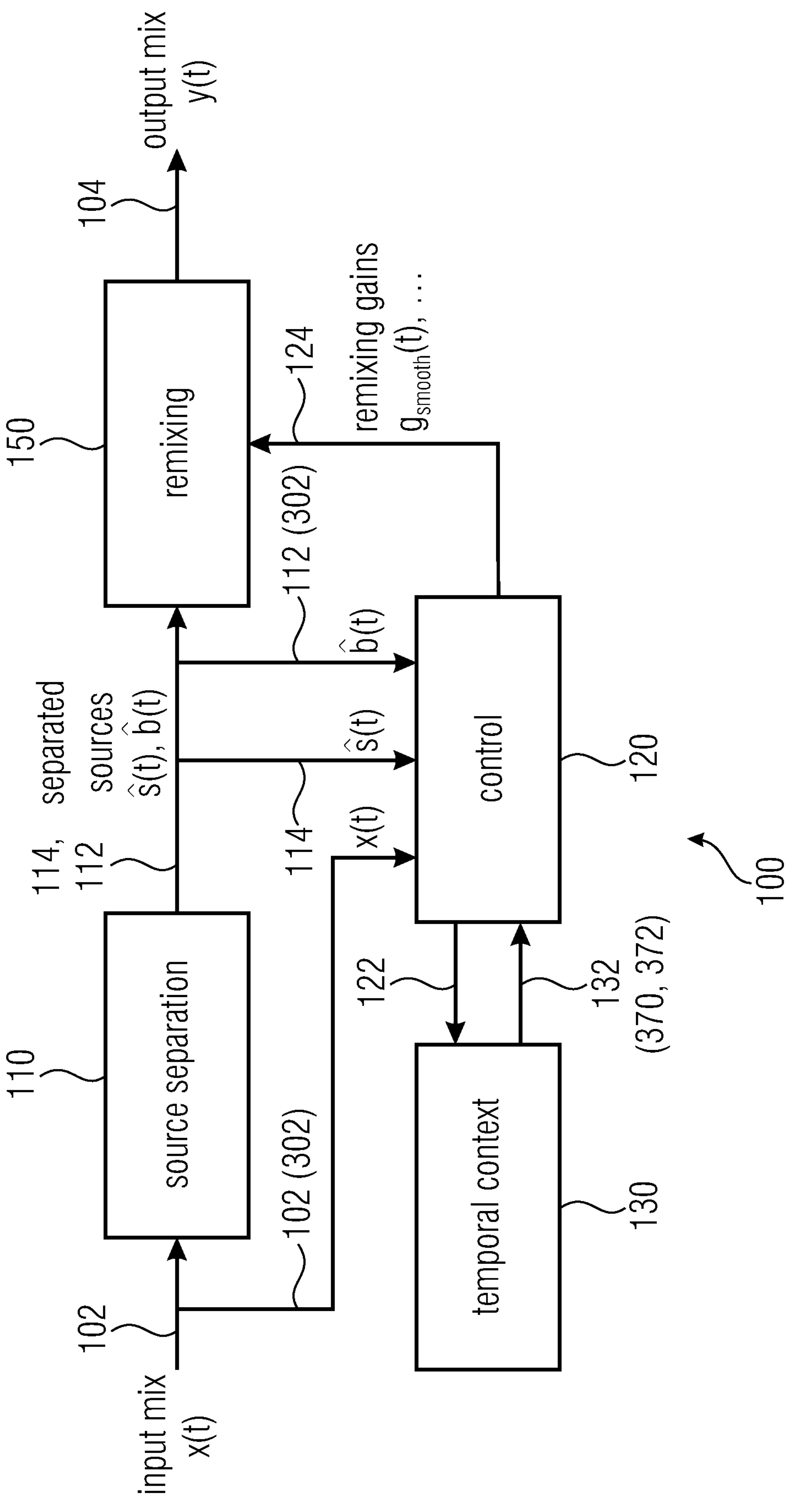
FIG. 1 shows a system according to an example.

FIG. 1: Main concept: Given an input mix, separated source signals are estimated and remixed by applying automatically generated time-varying, signal-adaptive gains. The remixing gains are generated by the control module with the aim of fulfilling a time-varying criterion concerning the separated source signals and their relationship in the output mix. The modules in the figure can be distributed in different devices, i.e., signal encoding, transmission, and decoding can take place before or after the remixing module.

3. EXAMPLES

3.1 Initial Discussion

For the following explanation we can categorize all signal components in an input mixture x(t) such that they belong to one of two source signals: a target source signal s(t) (e.g., the speech recordings of all speakers in a movie soundtrack or all lead instruments in a musical recording) and a background signal b(t) comprising all residual audio sources not belonging to the target source:

$$x(t)=s(t)+b(t). \quad (1)$$

Source separation of audio signals aims to estimate s(t), given the mixture signal x(t) (input signal 102). The output of the separation is an estimate of the target source $\hat{s}(t)$. Optionally more secondary sources can be estimated and output by the source separation module, e.g., an estimate of the residual sources $\hat{b}(t)$. It has to be noted that there are separation systems where $\hat{s}(t)$ and $\hat{b}(t)$ do not sum up to x(t), e.g., [5], but an estimate for $\hat{b}(t)$ can also be obtained as $\hat{b}(t)=x(t)-\hat{s}(t)$. In examples below, even if either $\hat{s}(t)$ (or, respectively, x(t)) is processed, it is also possible to obtain an estimation of x(t)(or, respectively, $\hat{s}(t)$), simply by adopting the formula $\hat{b}(t)=x(t)-\hat{s}(t)$ ($x(t)=\hat{s}(t)-\hat{b}(t)$, respectively).

A post-filtering can be applied to $\hat{s}(t)$ and $\hat{b}(t)$, e.g., an equalizer for enhancing and/or attenuating certain frequency regions or a post-processing for removing musical noise.

In many application scenarios, the estimated source signals $\hat{s}(t)$ and $\hat{b}(t)$ are not intended to be listened to separately, but they are remixed with a partial modification of the relative levels [2, 6]. The notion of Signal-to-Noise Ratio (SNR) can be used here, referring the level difference between s(t) and b(t) or their estimates.

There are many solutions for source separation, e.g., [2, 7, 8, 5] and references therein. The solutions may rely on hand-designed audio signal processing algorithms, e.g., [2], also referred to as "classical signal processing", or the solutions may be based on deep learning, see e.g., [8, 5]. The technique proposed in this report is not limited to any specific source separation system. The estimates of the sources are in real world likely not perfect. Various imperfections, such as cross-leaking components, artifacts, distortions, and colorations can be introduced by the source separation. It is important to consider this fact while remixing.

FIG. 1 shows an example of system 100. The system 100 may permit signal-adaptive remixing of separated audio sources. The system 100 may process an input signal 102 (input mix) x(t). The input signal may be a mono signal. This may apply to the target signal and the residual signal. The system 100 may provide, for example, an output signal (output mix) y(t) 104 (further post-processing can be applied, such as loudness normalization, dynamic range compression, or applying equalization). The system 100 may include a source separation block 110. The source separation block 110 may extract different signals from the input signal 102 (e.g., by signal processing, filtering, etc.). For example, from the input signal 102 a target signal 114 may be separated from at least one residual signal 112. An example may be, for example, a target signal $\hat{s}(t)$, which is separated from a background signal $\hat{b}(t)$ (residual signal). For example, the target signal 114 may be a speech, while the background signal 114 may include other sounds present in the input signal (e.g. ambience, effects, and music). In other cases, the target signal may be a signal which is filtered from the input signal 102, because maybe a user intends to have an increased level for the target signal 114 in respect to that at least one residual signal 112. For example, the target signal 114 may be speech only, estimated by blind source separation, and so on. It is possible for a user to identify the target signal 114 to be separated from the residual signals 112. A remixing block 150 may be provided, to provide the output signal (output mix) y(t) 104. The remixing block 150 may be input with the target signal 114 and the one or more residual signals 112 and can remix them according to modified gains 124. The remixing block may therefore operate by using a remixing matrix with coefficients (gains 124) which, in general, vary in time. It will be subsequently explained that at least one gain 124 at the remixing block 150 may be variable in time: e.g., different time instants or time slots of the target signal $\hat{s}(t)$ (114) and/or the at least one residual signal $\hat{b}(t)$ (112) may be subjected to gains which vary along the elapsing of time, and in particular based on the values (and for metrics obtained from them) of the target signal $\hat{s}(t)$ (114) at different (e.g., future or past) time instants or time slots. In fact, it has been understood that it is possible to modify the remixing gains in such a way that they evolve with time and they can, for example, provide some particular functions. Functions will subsequently be discussed (e.g. as smoothing gains) for reducing the level of the background in respect to the level of speech (e.g., embodying a function which is normally performed by the so-called ducking functions).

A control block 120 may be provided, which may have, in input, the target signal 114 and, for example, either the input signal 102 and/or the one or more residual signals 112 (the input signal 102 or the target signal 114 is also called "signal 302" or "first signal 302"). (FIG. 1 shows both the input signal 102 and the background signal 112 being input to the control block 120, but in some examples it may be that only one of the input signal 102 and the background signal 112 is actually inputted onto the control block 120). The control block 120 may make use of a temporal context block 130. The control block 120 may request temporal context information 132 by exerting a control. The control block 120 may provide temporal information 122 on the current time instant or time slot which will be subsequently used as temporal context information 132 (e.g., for subsequent time instants or time slots, and/or for refining a previously obtained rough gain 125, so as to deviate from the rough gain 125 to obtain the remixing gain 124. As it will be shown later, the temporal information 122 on the current time instant or time slot may include at least one of the utterance integration block 330 (e.g., 332, 334) or information associated thereto; rough gain 343 and/or activity information (e.g. gate information) 342; a gated gain (e.g., rough gain 352, e.g. 125); and the at least one remixing gain 124 (e.g., $g_{smooth}(t-1)$). Some of these information will be explained in greater detail below.

On the basis of the temporal context information 132, the control block 120 may appropriately define, time instant by time instant or time slot by time slot, the at least one remixing gain (e.g. remixing gains) 125 to be provided to the remixing block 150. Accordingly, the obtained output signal (output mix) 104 will be remixed by keeping into consideration not only the target signal 114 at a particular time instant or time slot, but also on the target signal in the temporal context (e.g., future or past time instants or slots).

The input signal 102 and the separated signals 114, 112 (302), and/or the processed versions of those signals, are signals evolving in time along a discrete succession of time instants or time slots. Each time instant may be, for example, associated to a particular sample (e.g., signal in the time domain), e.g. present in the input signal (e.g. ambience, effects, and music). Otherwise, time may be understood as being subdivided (e.g. partitioned) into a plurality of time slots, and each time slot may be associated to a signal description in the frequency domain (e.g., digital Fourier transforms DFT, short-time Fourier transform STFT, fast Fourier transform FFT, and so on). In the frequency domain, a plurality of values may be associated to the particular time slot, each value being, for example, a coefficient to be associated to a particular frequency. There is no particular difference in this case between whether the signal(s) is(are) in the time domain or in the frequency domain. Hence, most of the following explanations are common for both the time domain case and the frequency domain case.

Figure 4:
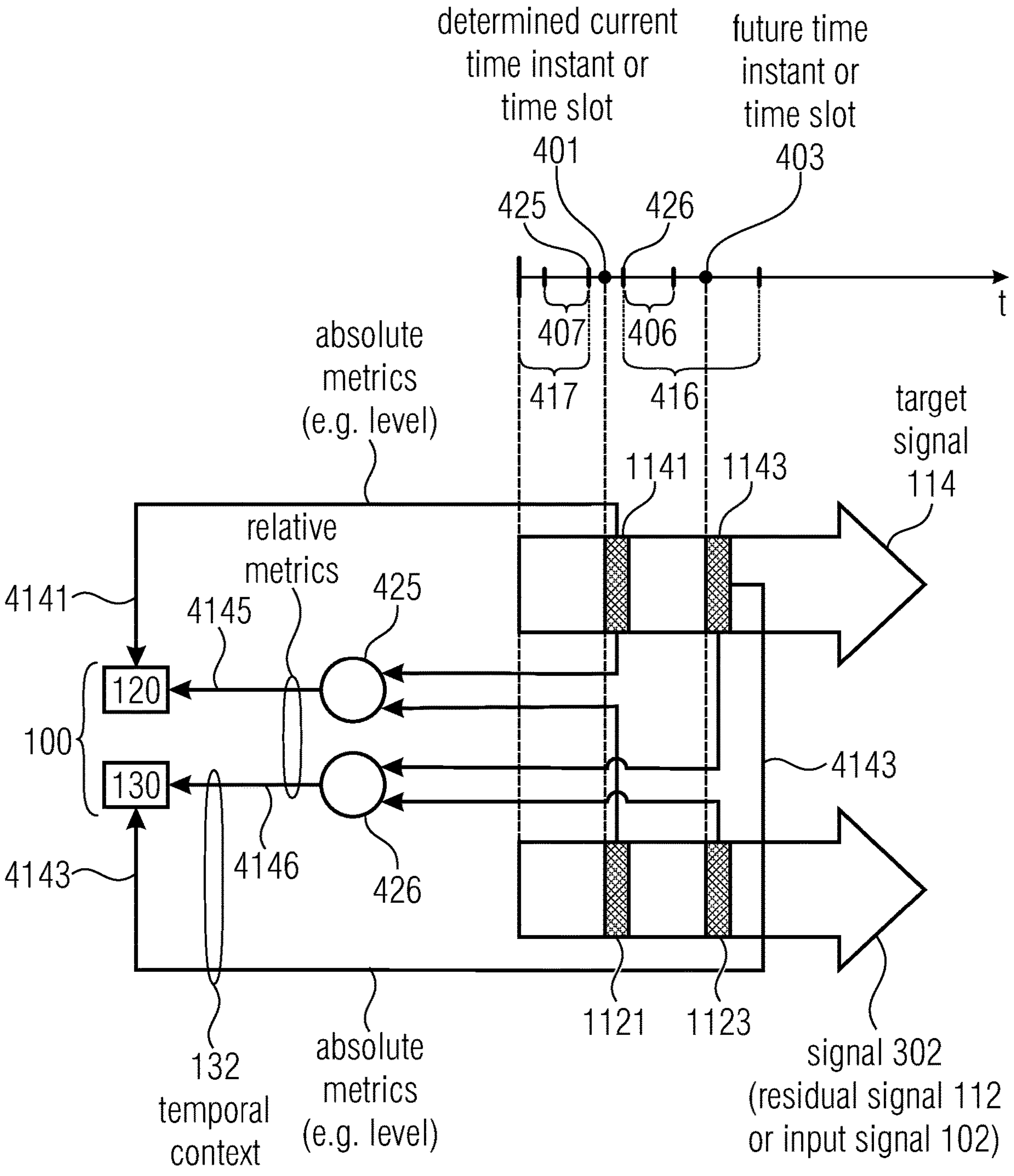
FIG. 4 shows an operation according to an example.

FIG. 4 shows an example of the evolution in time of the target signal 114 and the residual signal 112 or input signal 102 (signal 302, or "first signal 302", is used for indicating either the residual signal 112 or the input signal 102).

As seen in particular in FIG. 4, a time evolution is shown as a typical horizontal line, where time instants or time slots t are along a discrete succession. For each time instant or time slot in the discrete succession, both the target signal 114 and the signal 302 (102, 112) presents a value either in the time domain or in the frequency domain (the value may have multiple components; for example, if the value is in the frequency domain, a plurality of components may be provided, e.g. one component for each frequency band). For example, at the time slot 401 (subsequently often indicated as "current time instant or time slot 401" or "current determined time instant or time slot 401" or "determined current time instant or time slot 401"), the target signal 114 (or processed version thereof) presents the value 1141, and the signal 302 (112, 102) (or processed version thereof) presents the value 1121. Reference signs 406 and 416 refer to windows of consecutive time instants or time slots which are subsequent, in the discrete succession, to the current time instant or time slot 401. Analogously, reference signs 407, 417 refer to windows of consecutive time instants or time slots which are before, in the discrete succession, the current time instant or time slot 401. Reference sign 425 refers to the time instant or time slot immediately before the determined current time instant or time slot 401 (where the determined current time instant or time slot 401 is expressed as t, the time instant or time slot immediately before the determined current time instant or time slot 401 is expressed as t−1). In some examples, the at least one remixing gain is first obtained for the determined current time instant or time slot 401, and subsequently the determined current time instant or time slot 401 is obtained. The target signal 114 and the signal 302 (112, 102) (or processed versions thereof) also present some values for the slots of the windows 407 and 406, even though they are not shown in FIG. 4. Put together, in some examples the windows 407 and 406 and the determined current time instant or time slot 401 may form a time window which includes the determined current time instant or time slot 401. In accordance to the temporal context information as needed, it may be possible to make use of any of the time slots or time instants 407, 417, 425, 406, 416, 426, which are all in the future or in the past. In some cases, the windows in the past, in the future, or both in the past and future may have a predetermined time length (e.g., a predetermined number of time instants or time slots). For example, window 416 may comprise a predetermined number of time instants or time slots. It may be, in some examples, that the plurality of time instants or time slots 406 are some slots within the window 416. In some examples, at least one (or both) of the windows 406, 416 is immediately before or immediately after the current time instant or time slot 401. In some examples, at least one (or both) of the windows 406, 416 is not immediately before or immediately after the current time instant or time slot 401.

The time instant or time slot 403 (subsequently indicated to as "future time instant or time slot 403") happens to be, in the time evolution (according to the discrete succession) of the target signal 114 and of the signal 302, subsequent to the current time instant or time slot 401. Accordingly, the time instant or time slot 403 is understood to be "in the future" with respect to the time instant or time slot 401. The values of the target signal 104 and of the signal 302 (112, 102), or processed versions thereof, are respectively indicated to with 1143 and 1123. It will be shown that it is possible to have different remixing gains 124 for different time slots or time instants. Moreover, it is possible to adapt the gain 124 associated to the time instant or time slot 401 as being obtained by also considering the value of the time instant or time slot 403.

The same may be performed for other time instants or time slots with respect to the time instant or time slot 401.

However, when the time instant 401 is processed, the values 1143 and 1123 at the future time instant or time slot 403 may be already known (e.g., stored in buffers). Below, where it is explained that the time instant or time slot 401 is the current time instant or time slot, it is meant that the current time instant or time slot 401 is currently processed, even though the future time instants or time slots (e.g., 403) are already known and/or some form of preprocessing is already performed to the future time instants or time slots, e.g., 403. Accordingly, the fact that some time instants or time slots are in the future shall not be understood as obtaining some features which are unknown, but it is more than the current time instant or time slot 401 is adapted to the future time instant or time slot 403, which is already known.

For example, it is possible to first obtain rough remixing gains (e.g. according to determined remixing criteria) for a plurality of time instants or time slots (e.g. for all the temporal evolution of the input signal), including any of 401, 403, 407, 417, 425, 406, 416, 426. After having obtained the rough remixing gains 125, it is subsequently possible to obtain the remixing gains 124, e.g. by performing deviations from the rough remixing gains 125 (in particular in transitory intervals or transition intervals) so as to obtain the remixing gains 124, e.g. by making use of temporal context information. This process may be performed iteratively, e.g. by first obtaining the remixing gains 124 for time instants in the past, then for a present time instant, and subsequently for the time instants in the future.

Moreover, it is intended that, after having processed the current time instant or time slot 401 (e.g. $t_1$), subsequently the current time instant or time slot 401 is updated to another time instant or time slot (e.g. the time instant or time slot immediately subsequent $t_2=t_1+1$).

FIG. 4 also shows that the control block 120 receives (or measures) at least one metrics from the current time instant or time slot 401, while the temporal context block 130 receives (or measures) at least one metrics taken from the values 1143 and 1123 of the target signal 114 and of the signal 302 (residual signal 112 or input signal 102, or processed version thereof) at the future time instant or time slot 403 (the same could be done for a past time instant or time slot, which are not shown in FIG. 4 but which may be used exactly as the future time instant or time slot 403). The same may apply to the time instants or time slots 407 (in the past) or the time instants of the window 406 (in the future).

The at least one metrics which are obtained may include, for example, absolute metrics 4141 and/or 4143 associated to absolute magnitudes (e.g., loudness, level, power, energy, etc., of the particular signal 114 or 302) at the current time instant or time slot 401 or 403, as can be obtained, for example, from the value 1141 and/or 1143.

The at least one metrics which are obtained may include, for example, relative metrics 4145 and 4146. The relative metrics 4145 and/or 4146 may be the at least one metrics. For example, a relative metrics 4145 may be obtained by comparing, for example, an absolute metrics of the target signal 114 (e.g., as obtained from value 1141) with an absolute metrics of signal 302 (112, 102) at the current time instant slot 401 (e.g., as obtained from value 1121). Another relative metrics 4146 may take into account values 1143 and 1123 of the target signal 114 and the signal 302 (112 or 102) in the at least one future and/or past time instant or time slot

403. The metrics 4145 and 4146 are shown as being obtained at comparing blocks 425' and 426', respectively. An example of relative metrics 4145, 4146 the (possibly frequency-weighted) may be the relative intensity of the signals, e.g., SNR(t) (also indicated as $SNR_{in}(t)$ in formulas (5) and (6)), which may imply, for example, a ratio between absolute metrics such as those above. Multiple relative metrics may form a composite relative metrics. A metrics may imply, for example, a norm on the instant value of the signal. For example, a 1-norm, a 2-norm, etc. may be used. The metrics may be a norm, such as 1-norm, a 2-norm, etc. A norm may provide a non-negative real number which keeps into consideration the channels of the signal (e.g., the sum of their absolute values, the square root of the sum of their squared values, etc.). Further, multiple metrics (absolute metrics, relative metrics, or both) may be combined with each other to obtain a metrics which is a composite metrics (and partially relative metrics and partially absolute metrics).

An example of absolute metrics 4141, 4143 is the absolute intensity of the signals, possibly frequency-weighted, e.g. absolute metrics such as the intensity of the target signal 114 and/or the intensity of the signal 302 (e.g., 102, 112), respectively. Another example of absolute metrics 4141, 4143 may be an estimate of the perceived time-varying loudness and/or loudness difference. Another example of absolute metrics is a time-dependent quality or intelligibility metric or a speech activity probability. Another example of absolute metrics is a combination of these or other time-dependent features of the signals (multiple absolute metrics may form a composite absolute metrics).

Particular functions may be obtained with the present examples. For example, it is possible to apply the most appropriate remixing gains at each time instant or time slot (401, 403, etc.) and, for example, smoothing some gains (e.g., when transitioning from a first remixing gain to a second remixing gain, as will be explained below).

The generation of the at least one remixing gain 124 may be subjected to the definition of one or more remixing criteria. A remixing criterion may be, for example, a criterion for obtaining a particular goal (e.g., attenuating a background signal or boosting a particular target signal). The choice of a particular criterion may generally be associated to the metrics 4141 and/or 4145 (or respectively 4143 and 4146) in a particular time slot 401 (or respectively 403). A remixing criterion may therefore be associated to the value of a particular time instant or time slot 401 or 403. It may be seen that, in some cases, the current time instant or time slot 401 and the past and/or future time instant or time slot 403 are two time instants or time slots for which different remixing criteria are chosen (e.g. due to different results of an activity detection operation). It may be that, for the determined current time instant or time slot 401, the control block 120 chooses not to completely follow the remixing criterion as would be defined based on the metrics 4141 and 4145 of the target signal 114 at the current time instant or time slot 401: the control block 120 may therefore keep into account the temporal context 132. For example, while different remixing criteria may be defined for the current time instant or time slots 401 and 403 on the basis of the metrics 4141 and 4145 associated to the same time instant or time slot, the remixing criteria can also be not completely respected, by virtue of using the temporal context 132 and in particular, the metrics 4146 and/or 4143 associated to future and/or past time instants or time slots, thereby operating a deviation.

Figure 2:
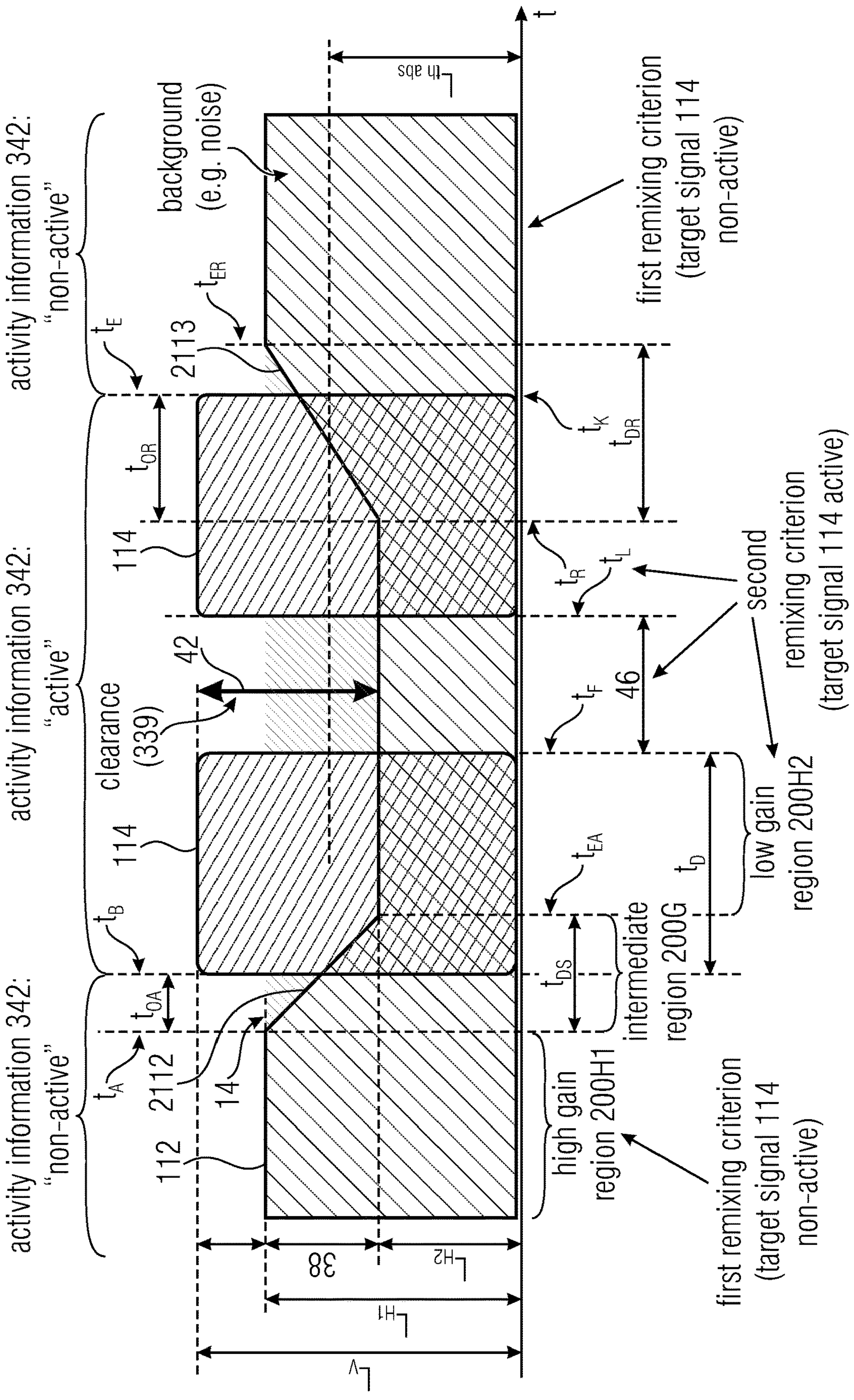
FIG. 2 shows an operation according to an example.

FIG. 2 shows an example of operation which may be obtained through the examples above. Here, it is possible to see that the target signal 114 (which could be imagined to be a human voice) is to be remixed with respect to noise (residual signal 112). The speech, when present, is at a loudness level $L_V$. The noise 112 (residual signal, background signal) is shown to be acquired as having a constant level $L_{H1}$. At time instant $t_B$, speech 114 starts. The speech 114 transitorily ends at time instant $t_F$, but restarts again at instant $t_L$, hence defining a brief time interval 46 without voice 114 (it may be a time interval between the enunciation of one first word and the enunciation of one second word). Subsequently, at instant $t_K$ (also indicated as $t_E$), the speech 114 ends again (it may be that the speaker does not enunciate words anymore).

At instant $t_B$, noise 112 (residual signal, background signal), which was previously at level $L_{H1}$, is to be subsequently played back at level $L_{H2}<L_{H1}$, so as to increase the quality of the output signal 104 by reducing the noise 112 (by a quantity indicated by 38 in FIG. 2), to permit the listener to better understand the speech 114.

In theory, for the time instants or time slots before time instant $t_B$, a unitary remixing gain (e.g. 0 dB) could be applied to the noise 112, while a remixing gain less than unitary (negative in decibel) could be chosen for time instants or time slots after time instant $t_B$ (in particular in the interval $t_{DA}$). Hence, the level of the noise 112 would be modified from level $L_{H1}$ to a level $L_{H2}$ which causes the difference between the speech 114 and the noise 112 to be the quantity indicated with 42 (clearance). This is a behavior which is subdivided in two remixing criteria:

- a first remixing criterion for the time instants or time slots before $t_B$ (in particular in the interval $t_{OA}$) with unitary remixing gain (0 dB) for the noise 112 (which therefore would have the level $L_{H1}$);
- a second remixing criterion for the time instants or time slots after time interval $t_B$, with gain negative in decibel (less than unitary gain in linear coordinates).

An example in formula (4) (see below, and see also formula (5)).

The first remixing criterion may be based, for each time instant or time slot before $t_B$, on relative and/or absolute metrics 4145, 4141 associated to exactly that time instant or time slot. On the other side, the second remixing criterion may be based, for each time instant or time slot in the interval $t_{DS}$ (but which is in the future with respect to the time instants or time slots before $t_B$), on relative and/or absolute metrics 4146, 4143 associated to exactly that future time instant or time slot. At time slot or time instant $t_B$, an abrupt change of criterion (and of gate, accordingly) would occur, and the noise 112 would jump from level $L_{H2}$ to level $L_{H1}$.

However, it has been understood that this abrupt change would not be pleasant for a listener, and could cause an unwanted pumping effect.

A more smoothed transition (e.g. identified by ramp 2112 in FIG. 2) is therefore in principle advantageous. As show in FIG. 2, starting from time instant $t_A<t_B$, a gradual reduction of the remixing gain for the noise 112 is performed. Accordingly, the pumping effect is not audible or at least less audible. Therefore, throughout the time interval $t_{DS}$, the gain for the background 112 (residual signal) is progressively reduced in respect to the level $L_V$ of the speech (target signal 114).

Notably, we obtain a subdivision into three regions:

- a first, high gain region 200H1 of time instants or time slots before $t_A$, at high gain 124 for the noise 112 (which is at high level $L_{H1}$);

- a third, low gain region 200H2 of time instants or time slots after $t_{EA}$, at low gain 124 for the noise 112 (which is at low level $L_{H2}$); and
- a second, intermediate gain region 200G of time instants or time slots in the interval $t_{DS}$, in which the remixing gain 124 of the noise 112 is gradually decreased (and the level is accordingly gradually decreased from $L_{H1}$ to $L_{H2}$), thereby generating ramp 2112.

In other terms, we note that:

- in the first, high gain region 200H1, the first remixing criterion is strictly observed, and the gain 124 for each time instant or time slot of the noise 112 is based on the metrics associated to that particular time instant or time slot;
- the same applies to the third, low gain region 200H2, for which the second remixing criterion is strictly observed, and the gain 124 for each time instant or time slot of the noise 112 is based on the metrics associated to that particular time instant or time slot;
- in the second, intermediate region 200G, deviations on the first remixing criterion and/or on the second remixing criterion are performed, and the ramp 2112 can be obtained.

In the second, intermediate region 200G (interval $t_{DS}$), the determined current time instant or time slot 401 will have a remixing gain 124 which is intermediate between those associated to the current time instant or time slot before $t_A$ and after $t_B$.

The same applies in the interval $t_{DR}$ (in which ramp 2113 is experienced), at which the remixing gain 124 also changes gradually again causing the noise 112 to change from level $L_{H2}$ to a higher level $L_{H1}$. Even in this case (ramp 2113), at any determined current time instant or time slot before $t_E$ (e.g. in interval $t_{OR}$), the remixing criterion provides a rough value of the gain that would cause the level $L_{H2}$, while a time instants in the time interval $t_{DR}$ after $t_E$ should have a remixing gain causing the level $L_{H1}$. However, it is possible to take into account the gain as it would be at in the time instants after $t_{ER}$ according to the criterion, and accordingly, choose a remixing gain value intermediate between the gain value that causes the level $L_{H2}$ and the gain value which causes the gain $L_{H1}$. This is dual to the above-mentioned case of ramp 2112, where at any determined current time instant or time slot before $t_B$ (e.g. in interval $t_{OA}$), the remixing criterion provides a rough value of the gain that would cause the level $L_{H1}$, while a time instants in the time interval $t_{DS}$ after $t_B$ should have a remixing gain which is the gain that causes the level $L_{H2}$. However, it is possible to take into account the gain as it would be at in the time instants after $t_{EA}$ according to the criterion, and accordingly, choose a remixing gain value intermediate between the gain value that causes the level $L_{H2}$ and the gain value which causes the gain $L_{H1}$. The duality can be easily seen in intervals $t_{DS}$ and $t_{DR}$, and is obtained, for example, by applying formulas (10), (11), and (12) (see below). To achieve this goal, in one example it is possible to apply the shifting as discussed, for example, in 4.9. Other techniques are notwithstanding possible.

In time interval 46, there is no gradual modification between two different remixing criteria, but instead it is remained in the remixing gain as would be defined by the second remixing criterion instead of moving towards the gain defined by the first remixing criterion. It is possible to make use, in some cases, of an utterance integration 330, which permits to recognize that the time interval 46 between the two time intervals (e.g. encompassing $t_{DA}$ and $t_{OR}$) at which the speech is obtained is still an interval in which the target signal 114 is active. It is noted that some remixing criteria may be dominant over other remixing criteria. For example, the second remixing criterion adopted in the remixing region 200H2 is dominant over the first remixing criterion adopted in the remixing region 200H1: we want to maintain the gain 124 for the residual signal 112 low for coping with situations in which the absence of the target signal is only due to a pause within two words, without increasing the loudness of the noise 112. To the contrary, the first remixing criterion is non-dominant: in the intermediate region 200G, the ramp 2112 is immediately generated, without waiting too much. Hence, before moving from one dominant remixing criterion towards a non-dominant remixing criterion, there may be inspected, in the target information in a time window immediately after the determined current time instant 401, whether the totality (or at least a great number, greater than a first predetermined threshold) of future time instants 406 (or 416) are associated to the non-dominant remixing criterion; while before moving from one non-dominant remixing criterion towards a dominant remixing criterion, there may be no such inspection, or in alternative there may be a less strong condition than that for transitioning from the dominant criterion towards the non-dominant criterion: for example, when transitioning from the non-dominant remixing criterion to the dominant remixing criterion there may be inspected whether a little number of future time instants (e.g. over a second predetermined threshold) or time slots is associated to the dominant criterion, wherein the second predetermined threshold is lower than the first predetermined threshold.

By virtue of the above, it is possible to see that a first remixing criterion and a second remixing criterion may be, in general, used for generating at least one rough remixing gain (e.g. in non-transitory phases). The rough remixing gain 125 may subsequently be corrected by applying a deviation (see also below), e.g. in transitory phases.

The different remixing criteria apply different gains (e.g. different rough gains) and, therefore, will cause different remixings. The discrimination between the remixing criteria is generally made based on a criterion condition. The criterion condition may take into account the metrics 4145 (absolute metrics for the determined current time instant 401) and/or 4141 (relative metrics determined current time instant 401) (see FIG. 4). Therefore, if different time instants or time slots have different values 1141, and consequently different metrics 4141 and/or 4145, it may happen that they end being associated to different remixing criteria.

The criterion condition may take into account the metrics 4141 (absolute metrics for the determined current time instant 401) and/or 4145 (relative metrics determined current time instant 401) on the target signal 114 or a processed version thereof (such as version 314, 335 and, e.g. in case of relative metrics 4145, also versions 312 and 332 of the input mix 102 or the residual signal 112).

In non-transitory conditions (such as in high gain region 200H1 and in the low gain region 200H2), the first and second criteria may be easily respected. For example, in the high gain region 200H1, the first remixing criterion is respected: the gain for the time instants or time slots of the background signal 112 is maintained unitary. The second remixing criterion may provide a reduction of the gain for the residual signal 112 with respect to the first remixing criterion (or in particular, an increase of the ratio between the remixing gain associated the remixing gain associated to the target signal over to the residual signal 112 from the first remixing criterion to the second remixing criterion).

Notwithstanding, in some cases, as explained above, it is possible to deviate from the first and second criteria (e.g., in case of transitory; see intermediate region 200G in FIG. 2). An example is provided in the intermediate region 200G, in which the ramp 2112 is generated and the gains for the residual signal 112 are progressively reduced, to reach the reduced gain prescribed by the second remixing criterion for increasing the distance from the target signal 114. Notably, the deviation may be based on the temporal context information 132. Of course, the example of FIG. 2 is very general (see also formula (5) below), but other different criteria and/or criterion conditions may be chosen.

It is also to be noted that each of the first and second remixing criterion is associated to a rough remixing gain (the rough remixing gain based on the first remixing criterion being in principle different from the rough remixing gain based on the second remixing criterion), which can be, notwithstanding, modified (e.g. corrected, deviated). The deviation may be based, for example, on the temporal context information 132. The deviation is evident in FIG. 2 by virtue of the ramp 2112: before the time instant $t_B$ the first criterion would prescribe a higher gain for the residual signal 112, while, after $t_B$ the second criterion would imply that the gain should be at a lower level. By virtue of the deviation, the ramp 2112 is advantageously obtained. The same applies to ramp 2113: before the time instant $t_E$ the second remixing criterion would prescribe a lower gain for the residual signal 112, while, after $t_E$ the first remixing criterion would imply that the gain should be at a higher level. By virtue of the deviation, the ramp 2113 is advantageously obtained.

Figure 7:
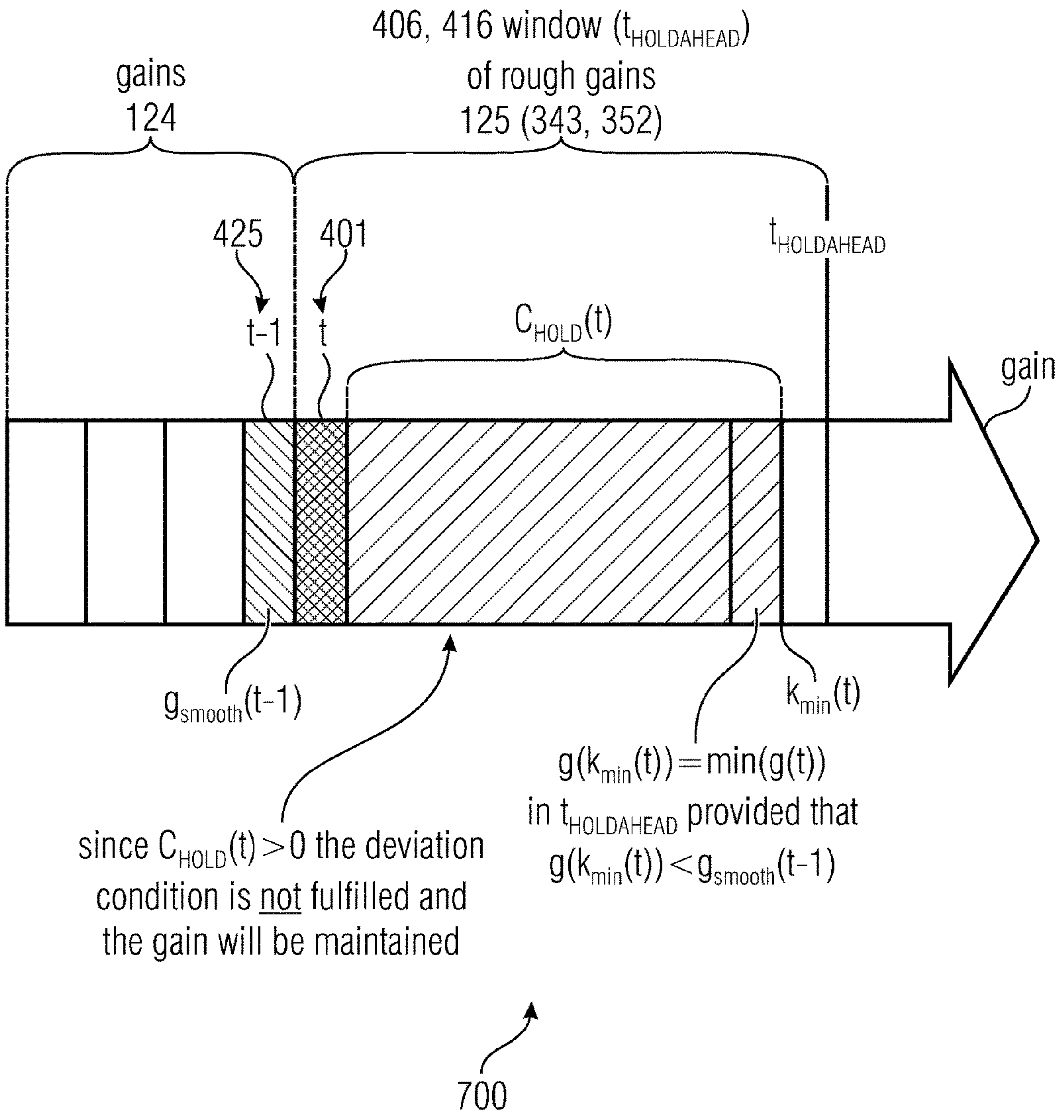

In particular, the deviation may take into consideration the time slots or time instants which are immediately subsequent to the determined current time instant or time slot 401 (e.g. window 406 or 416 in FIGS. 4 and 7). Alternatively or in addition, the temporal context information 132 used for the deviation may be based on a remixing gain obtained for a previous slot or instant (e.g., time instant 425 or slot 407 in FIG. 4), which may be at least one of the time slot or instant immediately preceding the determined current time slot 401. Accordingly, the deviation may be based on a linear combination of the rough gain 125 as obtained for the determined time instant or time slot 401, and the previously obtained remixing gain (also indicated with $g_{smooth}(t-1)$) of the immediately preceding time slot or time instant 425. An example is provided in formulas (10), (11), and (12) (see below).

Some transient variation of the target signal 114 and/or the residual signal 112 or input signal 102 may cause a time instant or slot to be associated to have an incorrect value, so that its metrics 4141 (absolute metrics) or 4145 (relative metrics) may be incorrect, which could drive to be associated to a wrong remixing criterion. In addition or alternatively, there may be the possibility of having a transient disturbance, noise. It is also possible to experience a pause between two words: in FIG. 2, during the time interval 46, the time instants or time slots appear to be associated to the first criterion (no ducking, like in the region 200H1), and the gain 124 for the residual signal 112 should move towards the high gain. This means that the listener should experience, after time instant $t_F$ the loudness of the residual signal 112 gradually increasing. This would cause an unpleasant audible effect. To cope with this problem, in interval 46 it is possible to make use of temporal content information 132 regarding the future time slots or time instants, so as to conclude that the first remixing criterion that would appear from the metrics is only temporary, and the first remixing criterion will be used soon. Accordingly, it is possible to deviate from the first remixing criterion (which would cause the increase of the gain for the residual signal 112) by performing a deviation that maintains the gain constant.

It is possible, as explained above, to verify whether a deviation condition is fulfilled or not. The deviation condition may be at least partially based on the temporal context information 132 (e.g., a window 406 or 416 of time instants or time slots, which are in the future with respect to the determined time instant or time slot 401). If all the future instants are associated to the second criterion (provided that they are in a time window 406 or 416 of a predetermined length, also indicated with $t_{HOLDAHEAD}$), then the deviation is performed by correcting the rough gain 125. Accordingly, the gain 124 for the residual signal 112 may gradually increase (time interval $t_{DR}$).

Figure 5:
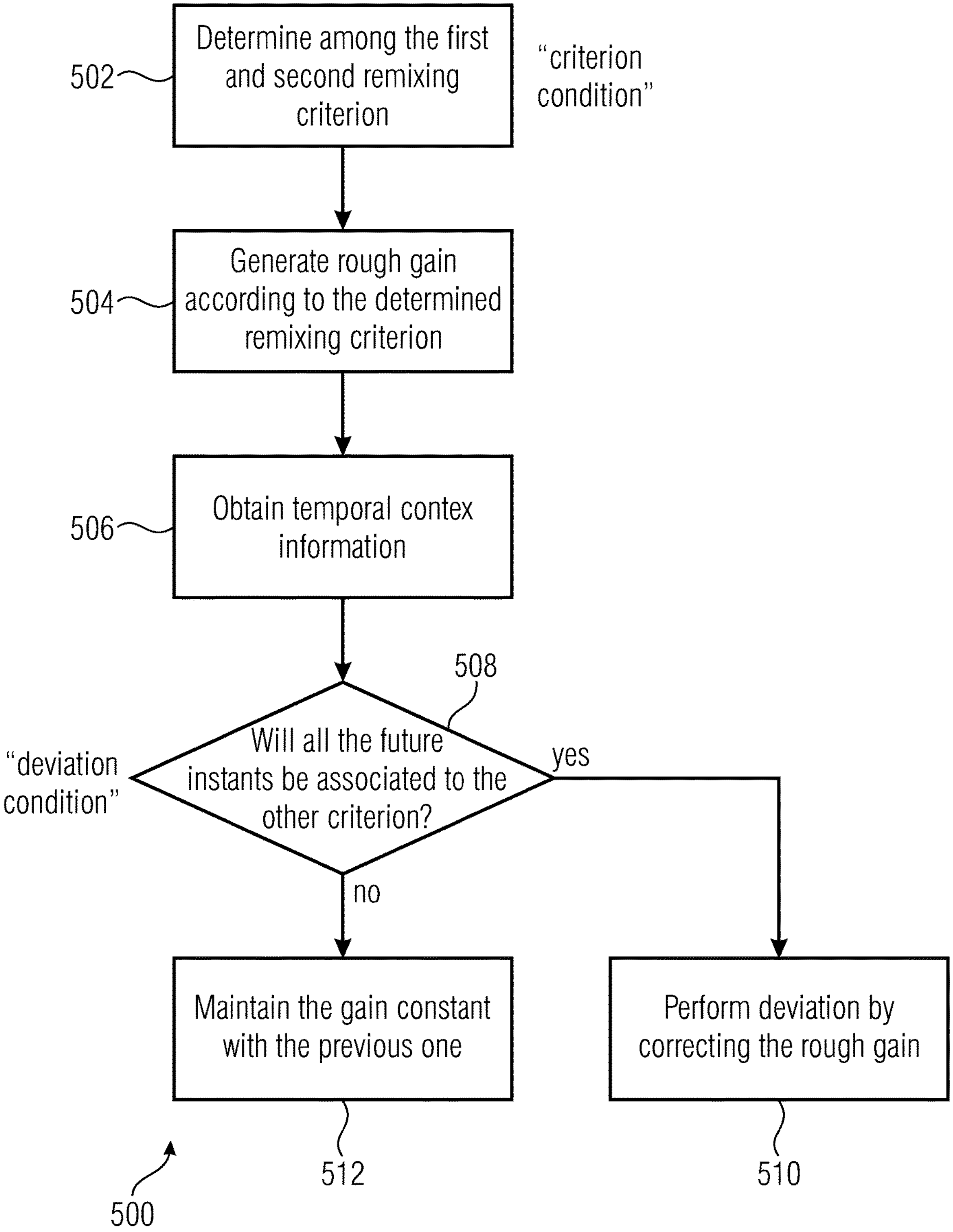
FIGS. 5-7 show operation according to examples.

An example valid for example for the transitory in time interval $t_{DR}$ and in time interval 46 is provided by method 500 of FIG. 5. At step 502, it may be determined whether the determined current time instant or time slot 401 is on the first or second remixing criterion. This may be an example of the evaluation of the criterion condition discussed above. This may be based on metrics 4141 (absolute metrics, e.g. intensity, etc.) and/or 4145 (relative metrics, e.g. $SNR_i$, etc.) on the determined current sample or time instant. Subsequently, a rough gain is generated at step 504 according to the determined criterion. Accordingly, the first and second criteria may prescribe different gains 125.

Subsequently, at step 506, it is intended to see whether the rough remixing gain 125 is to be corrected. Therefore, temporal context information may be obtained from the temporal context block 130. At step 508, the deviation condition is evaluated. A condition on the immediately subsequent time instants or time slots 406 or 416 immediately subsequent to the determined current time instant or time slot 401 may be evaluated. For example, if, within a predetermined time window of a predetermined length, all the subsequent time instants or time slots are associated to the different criteria, then it is transitioned to step 510, in which the deviation is performed by correcting the rough gain, e.g. using the techniques discussed with respect to formulas (10) and/or (12). This may be obtained, for example, by defining the at least one gain 124 as a linear combination which keeps into account both the rough gain (g(t)) as obtained from the metrics 4141 (absolute metrics) and 4145 (relative metrics) on the target signal 114 at the determined time instant or time slot 401 and by also taking into account the preceding version (e.g. $g_{smooth}(t)$) of the at least one gain 124 immediately preceding the determined current time instant or time slot 401. Accordingly, it may be gradually transitioned from a particular criterion to another criterion.

In case the evaluation of the deviation condition at step 508 determines that not all the future instants in the future time window 406 or 416 will be associated to another criterion, but some of them will also be associated to the current criterion as determined at step 502, then it is transitioned towards step 512 and the gain 124 is maintained constant with respect to the previous one (i.e., the gain 124 as already obtained for the immediately previous current time instant or time slot 425 immediately preceding the determined time instant or time slot 401). More in general, at step 508 it is possible to take into account a time instant or time slot preceding the time instants or time slots (e.g. 406 or 416) following the determined time instant or time slot, such as one of the two time instants or time slots (t and t−1) immediately preceding the time instants or time slots (e.g.

406 or 416) in the time window following the determined time instant or time slot, so as to compare whether the criterion associated to the future time window 406 or 416 is the same of the criterion associated to the one time instant or time slot (t, t−1) immediately preceding the time instants or time slots (e.g. 406 or 416) following the determined time instant or time slot, while at step 502 there may be, in addition or in alternative, determined the remixing criterion of the time instant or time slot t−1, as well.

In the present example, one remixing criterion is dominant (prevailing) with respect to another remixing criterion. For example, in FIG. 2 the second remixing criterion is dominant with respect to the first remixing criterion: while in time interval 46 the gain of the background signal 112 is maintained low, the same is not carried out for time interval $t_{DS}$(the ramp 2112 starts quickly). The second remixing criterion prevails over the first remixing criterion because we want that a quick pause between two words (between time instants $t_F$ and $t_L$) has not a change in the gain 124 for the background signal 112. This is not the situation occurring when transitioning in the interval $t_{DS}$, where there is a transition from the first remixing criterion to the second remixing criterion: we want that as soon as a speech starts (e.g., in instant $t_B$) the gain of the background signal 112 is quickly reduced (despite gradually). Hence, the second remixing criterion is chosen as being dominant with respect to the first remixing criterion. This also permits to avoid the evaluation of the deviation condition 508 and the subsequently use of block 112 when transitioning from the first remixing criterion to a second remixing criterion (interval $t_{DS}$ in FIG. 2). Hence, a version of FIG. 5 for a transition from a non-dominant criterion to a dominant criterion (like in $t_{DS}$) would only imply blocks 502, 504, 506, and 510, while blocks 506 and 510 would be directly connected without evaluations of other conditions. Blocks 508 and 512 would be deactivated.

Figure 6:
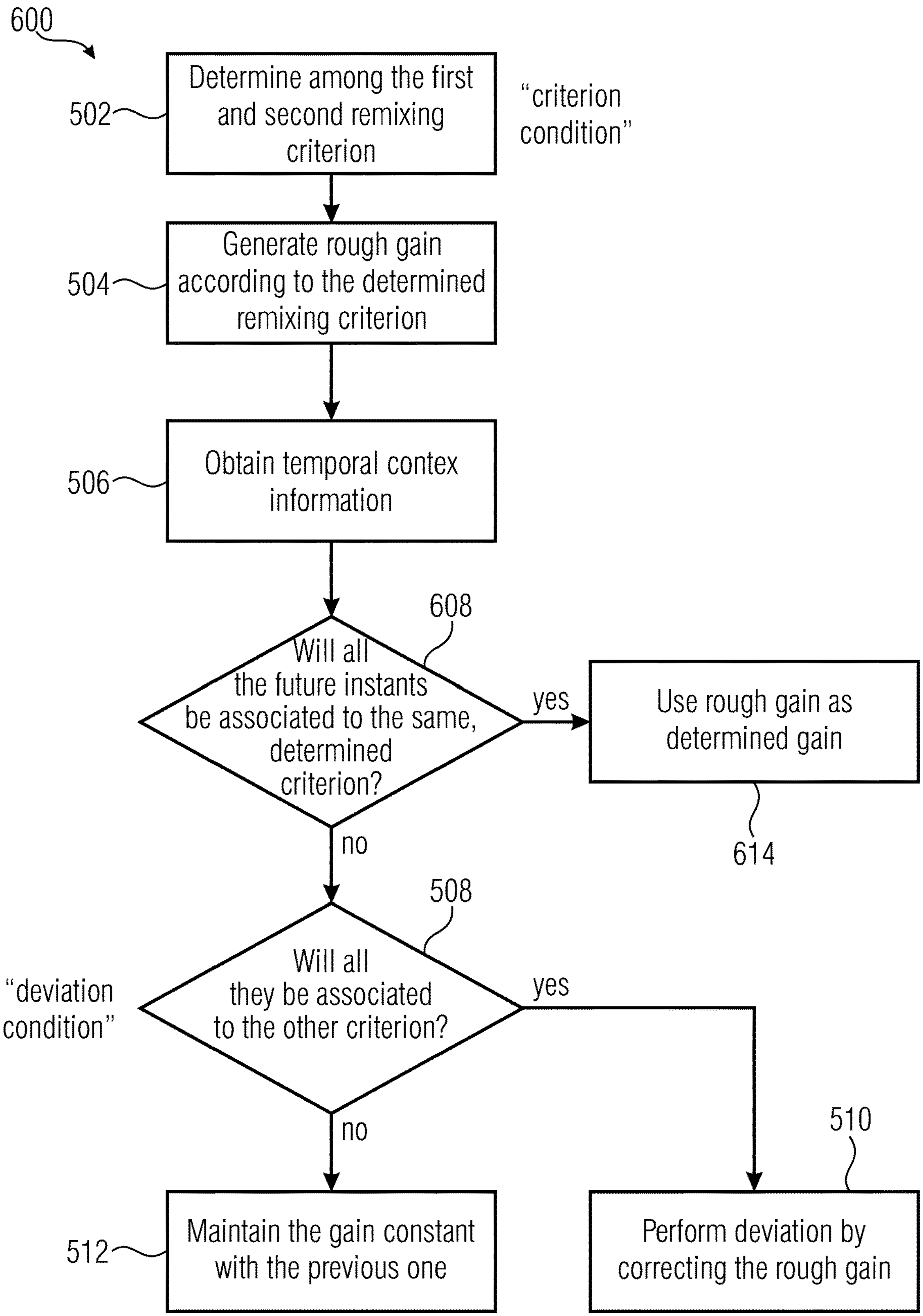

FIG. 6 shows a variant 600, which is not only valid for transitories (e.g. at transitions). This variant 600 is also valid for the non-transition regions (e.g., region 200H1 and region 200H2 in FIG. 2). Here, method 600 may have blocks 502, 504 and 506, which may be the same as those of method 500 of FIG. 5, or one of its variants, some of which are discussed above and below. However, a preliminary condition is evaluated in block 608, in which it is evaluated whether all the future instants or slots of the window 406 or 416 (e.g. immediately after the determined current time instant for slot 401) will be associated to the same criterion that has been determined in step 502. If the future instant time slots 406 or 416 are associated to the same criterion that is chosen for the determined current time instant or time slot 401 (or, in some variants, to the immediately preceding time instant or time slot 425, t−1) at step 502, then it is transitioned to step 614, where the same criterion is used and the rough gain is used as the determined gain without deviations. If, to the contrary, the evaluation of the preliminary condition 608 is negative (and it is therefore understood that there are, subsequently, some time instants or time slots for which the criterion will be different from that chosen at step 502 for the determined current instant or time slot 401), then the deviation condition 508 is evaluated. At that point, the same outcomes of method 500 of FIG. 5 and the same consequences (e.g., blocks 510 and 512) are followed. As explained above, the blocks 508 and 512 may, in some examples, be avoided in the case in which the criterion determined at step 502 is not a dominant criterion (in those cases in which a dominant criterion is actually defined). Method 600 may therefore describe the operations of FIG. 2 in such a way that the non-transitory time intervals (e.g., high gain region 200H1 and low gain region 200H2 in FIG. 2) are controlled by block 614.

In some examples, method(s) 500 and/or 600 may include, e.g. at the end, shifting the least one gain (124, $g_{smooth}$) as obtained for each time instant or time step of the discrete succession of time instants or time slots by a predetermined number of time instants or time steps towards the past.

FIG. 7 shows an example 700 that explains how to operate, in particular, for performing the deviation and/or for performing the evaluation. It is also further discussed and explained in subsection 4.8 herein below. Here, we see a gain evolution in time. The evolution shows the determined current time instant 401 (time t) the time instant or time slot 425 and, immediately subsequently to the determined current time instant 401 (t), a window 406, 416 of rough gains 125 is also defined. The window also subsequently explained as "$t_{holdahead}$" is defined. The window may have a predetermined length.

Notably, before the determined current time instant (t), the gain(s) 124 (including the immediately preceding time instant or time slot 425 or t−1) is(are) the gain(s) as already obtained (e.g., correct gains in previous iterations for preceding time instants, e.g. $g_{smooth}(t)$). On the other side, the remaining instants (instant or slot 401 and the subsequent ones) may have only the rough gain(s) 125, previously obtained based on the metrics (absolute metrics and/or relative metrics) on the target signal 114 that are at those time instants. Therefore, during the process, the final gain(s) 124 of each (all) time instant(s) are subsequently and iteratively updated.

In order to take into consideration the temporal context (e.g. at step 508), an evaluation may be performed on the window 406 or 416 ($t_{holdahead}$) of the immediately subsequent time instants or slots. Here, the rough gains 125 (g) are evaluated. It is looked (determined) whether they are associated to the first criterion or the second criterion, and/or it is looked (determine) whether they have the same remixing criterion of one of the time instants or slots immediately preceding the window 406 or 416, e.g. the determined time instant or slot 401. This may be the evaluation which is carried out in step 508 of FIGS. 5 and 6, and that causes the transitioning towards either step 510 or step 512. A discussion will be performed in subsection 4.8.

It is to be noted that it is not strictly necessary to evaluate the obtained gains in the window of rough gains. It is also simply possible to evaluate whether the first or second evaluation criterion are chosen (e.g., roughly chosen). After that, the correction will be performed as explained above.

Figure 3:
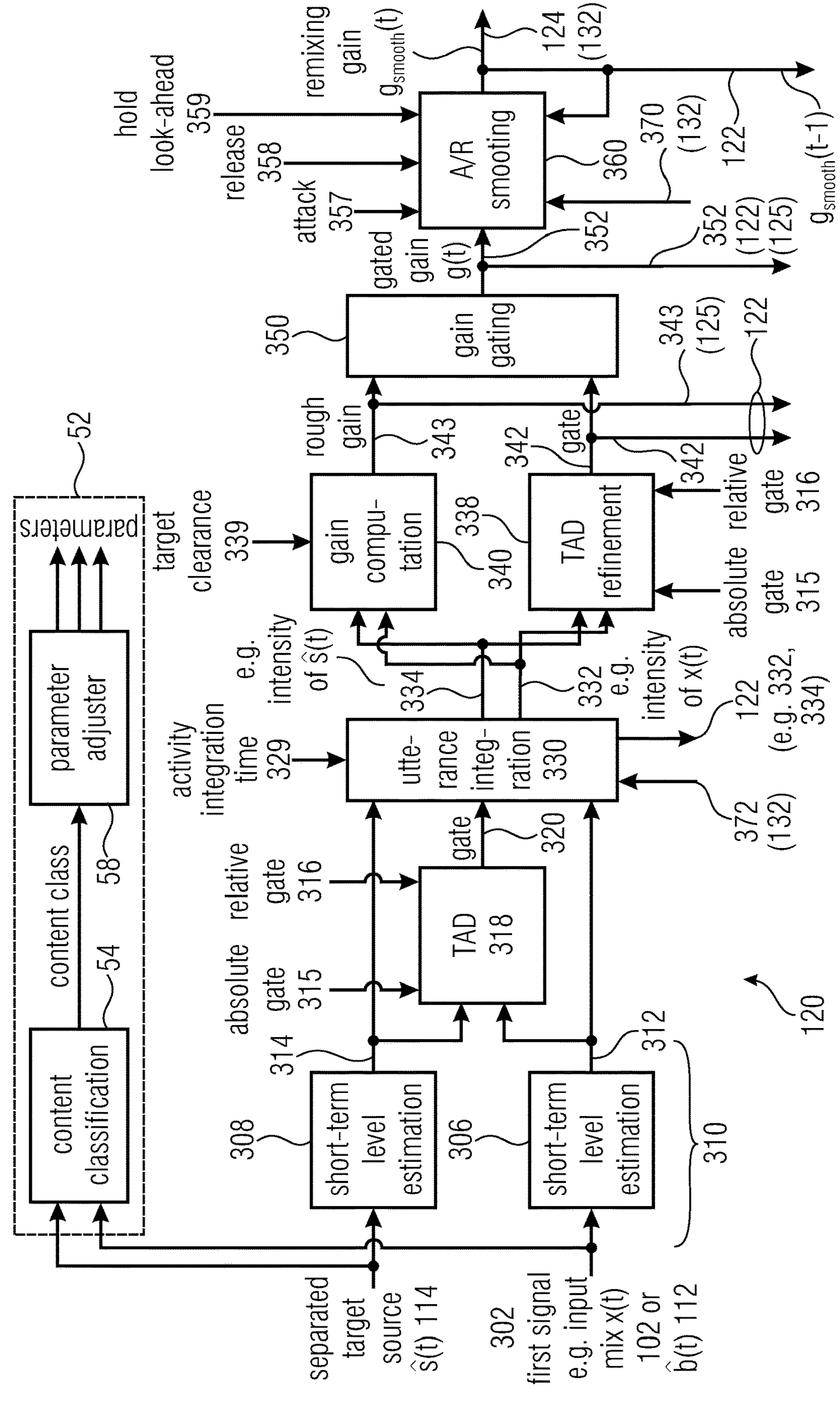
FIG. 3 shows a possible implementation of a block of the system of FIG. 1 according to an example.

FIG. 3 shows an example of control block 120, which may be adopted in some cases (e.g. it may cause the operations like in FIG. 2). However, in some examples the system of FIG. 1 may be different from the block 120. In this case, as input to the control block 120 there are provided the separated target source 114 or $\hat{s}(t)$ and the input signal (input mix) x(t) 102, which is here considered the so-called first signal 302. As an alternative to the provision of the input signal 102, it would also be possible to provide at least one of the residual signals $\hat{b}(t)$ 112 as signal 302. Notwithstanding, the description is here based by mainly assuming it is the input signal 102, which is provided to the control block 120. It will be shown that the control block 120 provides remixing gain $g_{smooth}(t)$ 124 which are to be provided to the remixing block 150.

Both the target signal 114 and the first signal 302 (112, 102) may be processed to obtain a short-term level estimation 314 and 312, respectively. The operations of the short-term level estimations will be explained below in subsection 4.2, but it is already explained that they are associated to a first order IIR filter. A smoothing time constant α may be used for both blocks 306 and 308. It is also possible to transfer into a logarithmic domain to better reflect the magnitude response of the human audio.

On the signals 114 and 302 (102, 112) (or on their processed versions 314 and 312) it is possible to perform a first target activity detection at TAD block 318. The operations of the TAD block 318 are also discussed below in detail in block 338 and in formula (5). In an example, the TAD block 318 may compare the target signal 114 (or a processed version 314 thereof) with an absolute threshold 315 ("absolute gate") and/or can compare the target signal 114 (or a processed version 314 thereof) with a relative threshold 316 ("relative gate") (e.g., in comparison with the first signal 302, i.e. the input signal 102 or one of the residual signals 112 or a processed version 312 thereof). If the target signal 114 is not big enough in comparison with the first signal 302 (input signal 102 or the residual signal(s) 112), then it is imagined that in the particular time instant or time slot, the target signal 114 is inactive. Accordingly, in short term activity information 320 may be generated indicating that the target signal is active. If, on the other side, the target signal 114 is not big enough (e.g., either in absolute terms or in relative terms with respect to the input signal or one of the residual signals) then the short-term activity information 320 indicates that the target signal 114 is supposed to be inactive (non-active). Here, the short-term activity information 320 is considered to be a gate signal, which may be understood as a binary information, which indicate that the target signal 114 is considered to be active or non-active. It is to be noted that the short term activity detection information 320 is not definitive in at least some examples. In fact, downstream, this information may be filtered and changed by also taking into account the behavior of the target signal 114 for the time instants and/or time slots closely consecutive to the determined current time instant.

It is to be noted that the short term activity detection information 320 may in general take into account uniquely the evolution of the signals 114 and 302 (e.g., 102 or 112) of the processed versions thereof 314 and 312, but in general does not take into consideration the signal (e.g. 114 and/or 302) at samples and/or instants around the considered time instant. As it will be shown in the following, this can give some issues, since it is possible that a pause is performed between two different words in a speech and this could cause (if the speech is the target signal 114) that the short-term activity information 320 is different between the samples and/or slots carrying the words and the sample and/or slot carrying the pause between the words. In some cases, this can be unacceptable, since this could cause the modification of the remixing parameters between the time instants and/or time slots carrying the word and the time instant and/or time slots carrying the pause between the words. Said in other terms, even if we may want that the speech has a gain which is relatively higher than the gains gained for the background, it is possible that we do not want to modify it instantaneously, since an instantaneous modification is understood as unpleasant by a human listening.

However, it has been understood that, by making use of context information (e.g., 370 and/or 372), it is possible to address at least some of these inconveniences. A context based integration block 330 is provided.

Block 330 may permit to perform an utterance integration (see also section 4.4 below). Block 330 may in some examples be described as follows: a cumulative sum of the target signal 114 (or one of its processed version 314, 334) and a cumulative sum of first signal 302 (112 or 102, or one of its processed versions 312 or 332) may be obtained depending on whether activity is detected (based on the activity information 320) for time instants or time slots for which activity is detected. In some examples, all the time instants or all the time slots of an interval in of time instants associated to the same criterion are assigned the same value (e.g. the average of the cumulative sum), and they may be assigned to have the same value. Notably, in case some scattered time instants or time slots are associated to a different criterion (e.g., to the dominant criterion), they may be reassigned to the dominant criterion. In addition or in alternative, the block 330 may wait up to a minimum threshold of consecutive time instants or time slots associated to the non-dominant criterion before giving the same value for all the preceding time instants and time slots. This may therefore be an averaging which makes use of temporal context information from the future and/or from the past. Further information is provided in section 4.4.

The output of the block 330 may be an averaged version of the target signal 114 (314) and the first signal 302 (102, 112). A gain computation block 340 may be provided. The gain computation block 340 may operate according to a constraint (such as a target clearance in the example of the attenuation as shown in FIG. 2) 339 (e.g. C). The output 343 of the gain computation block 340 may be a rough gain 343. Reference can also be made to section 4.6 below and an example is provided in formula (5). A target activity refinement (TAD) block 338 may substantially perform a similar operation of the TAD block 318 and may provide an activity information 342 which may be substantially similar to the short term activity detection 340, but which takes into account a more stable processed version of the signals 114, 112 and/or 102 (302). This may be due the fact that the utterance integration permits to tolerate long intervals without activity of the target signal 114. Basically, the gate signal 342 as outputted by the TAD refinement block 338 provides an activity information of the target signal 114. To give an example taken from FIG. 2, the activity information may be "active" in interval 46, without distinctions between the status activity information in the interval 46 in the other intervals between $t_B$ and $t_E$. (To the contrary, the short-term TAD block 318 provides an activity information which is "active" when the speech 114 is at a level $L_v$, while the other intervals, including interval 46, would have given a "non-active" output).

It is noted that the gain computation block 340, as such, defines a remixing criterion which only takes into account the metrics 4141 (absolute metrics) and/or 4145 (relative metrics) of the current time instant 401, but does not take into account future or past time instants or slots 403 and their metrics 4146 (relative metrics) and/or 4143 (absolute metrics). The output 343 of the gain computation block 340 may therefore be, in some examples, an output which does not provide a variable remixing gain (e.g. it is not smoothed). It is possible to understand the output gain 343 as a rough remixing gain which has to be subsequently refined by taking into account metrics (e.g. relative metrics 4146 and/or absolute metrics 4143) on future time instants and/or past time instants. Notably, the gain computation block 340 basically embodies the second remixing criterion which is verified, for example, in the third, low gain region of FIG. 2 (between $t_B$ and the end of the interval $T_{OR}$).

The TAD refinement block 338 may be seen as identifying the time intervals in which the second remixing criterion is not to be used. This can be, for example, the high gain region 200H1 of FIG. 2, in which, e.g. based on the absolute relative metrics 4141 and 4145, no activity of the target signal 114 is detected. It is noted that the inputs 315 and 316 of the TAD refinement block 338 are not necessarily the same of the inputs 315 and 316 of the short-term TAD block 318, but in some examples at least one (or both) the inputs 315 and 316 of the TAD refinement block 338 may be the same of respectively one of the inputs 315 and 316 of the short-term TAD block 318.

The activity information 342 operates like a gate in gain gating block 350. The activity information 342 may discriminate between choosing the first remixing criterion and the second remixing criterion. Notably, the output 352 of the block 350 (gated gain) is still a rough gain. In the example of FIG. 2, the rough gated gain 352 (e.g. 125) can take two values:

1) A first value (e.g. 0 decibel) in the first high gain region 200H1 before the time instant or time slot $t_A$ according to the first remixing criterion;
2) A second, lower value (e.g. negative decibel) after time instant $t_B$ according to the second remixing criterion.

With reference to formula (5) (see below), it may be that the rough gain g(t) is defined as:

$$\begin{cases} g(t) = 1, \text{ if } SNR_{in}(t) > C \text{ or } \hat{I}_s < G \\ g(t) = \sqrt{\dfrac{SNR_{in}(t)}{C}}, \text{ otherwise} \end{cases}$$

In this case, the rough gain (gated gain) 352 (125) may be g(t). The determination between the different gains may be made by taking into account the absolute gate 315, which may be the value G with which the intensity $\hat{I}_s$ (absolute metrics) is compared, so as to obtain the activity information (which e.g. provides information whether the speech is active). The determination between the different gains may be made by taking into account the target clearance so that, if $SNR_{in}(t)>C$, then the first criterion (e.g. g(t)=1) is chosen, otherwise the second criterion $$\left(\text{e.g. } g(t) = \sqrt{\frac{SNR_{in}(t)}{C}}\right).$$

Different ways of defining the rough gains (and/or of determining which remixing criterion each time instant pertain) may be implemented.

It is to be noted that, in examples, the elements 308, 306, 318, 330, 52, 54, 56 shown in FIG. 3 may be optional. When it is referred to the input signal 102 (e.g. input mix) and/or residual signal 112 (or more in general first signal 302), it is also possible to refer to their processed version(s), e.g. 312 and/or 332. On the other side, when it is referred to the target signal 114, it is also possible to refer to its processed version(s), e.g. 314 and/or 334. The signals (or processed version thereof) may be used to obtain, for example, the relative metrics (e.g., $SNR_i$) and/or the absolute metrics (e.g., intensities).

At block 360 (smoothing block), it is possible to smoothly modify the remixing gain for the noise 112 (e.g. actuating a deviation from the remixing criteria). Here, the ramp 2112, for example, may be generated. In the time instants and/or time slots in the intermediate region (interval $t_{DS}$), neither the first remixing criterion nor the second remixing criterion is used. To the contrary, temporal context information (as explained above) permits to take into account past time instant(s) and/or future time instant(s). Therefore, the gain can be gradually reduced in the ramp 2112. The same would apply in the interval $t_{DR}$, where an ascending ramp 2113 is obtained analogously. Reference can also be made to sections 4.7 and 4.8 below. It is also noted that at least one remixing gain 124 may be seen as being obtained by refining a rough remixing gain 343 or 352 by adding an additive component (modifying component) which corrects the rough remixing gain 343 or 352, smoothening the obtained remixing gain 124.

In some examples, also the start of the ramp 2112 or 2113 (at time instant $t_A$ or $t_R$) is based on the knowledge of the future temporal context information: knowing that there will be a change in remixing criterion soon (e.g. within a temporal window 406 or 416 immediately subsequent to the determined time instant or time slot 401), the deviation may start.

Reference can be made, for example, to formulas (10) and (12). Hence, the modifying (correcting) can be based on the immediately preceding and/or subsequent time gain 124 ($g_{smooth}(t-1)$) as previously provided. By taking into account the gain as output for the immediately preceding time instant or time slot it is possible to obtain a gradual descending or ascending effect for the gain. This is shown in formula (10) below is for the descending gains (e.g., ramp 2112 in the intermediate region in the interval $t_{DS}$) and formula (12) is for ramp 2113 in the interval $t_{DR}$. It may be stated, therefore, that the rough gain 343, 352 is refined by taking into account future and/or past time instants or time slots 403. Block 360 may have inputs 357 (associated to $\tau_{att}(t)$; 358 ($\tau_{rel}(t)$) and $t_{holdahead}$ (359) as explained in sections 5.7 and 5.8. It is noted that $\tau_{att}$ is greater than $\tau_{rel}$.

As explained above, the control block 120 may provide temporal information 122 on the current time instant or time slot which will be subsequently used as temporal context information 132 (e.g., for subsequent time instants or time slots, and/or for refining a previously obtained rough gain 125, so as to deviate from the rough gain 124 to obtain the remixing gain 125). As it will be shown later, the temporal information 122 on the current time instant or time slot may include at least one of the output of the utterance integration block 330 (e.g., 332, 334) or information associated thereto; rough gain 343 and/or activity information (e.g. gate information) 342; a gated gain (e.g., rough gain 352); and/or the at least one remixing gain 124 (e.g., $g_{smooth}(t-1)$). Some of these information will be explained in greater detail below.

3.2 Time-Varying Gains

As explained above, we propose, inter alia, to generate the output mix y(t) (output signal 104) by remixing the estimated sources with a time-varying linear combination:

$$y(t)=h(t)\hat{s}(t)+g(t)\hat{b}(t), \tag{2}$$

where t is the time-index (time slot or time instant) and h(t) and g(t) are the signal-adaptive remixing gains to be determined by the control module (control block 120), for which additional details are given in Sec. 3.3. This is equivalent to combining $\hat{s}(t)$ and x(t), i.e., $y(t)=k(t)\hat{s}(t)+z(t)x(t)$, where k(t) and z(t) are the remixing gains in this case. The remixing gains h(t), g(t), k(t), z(t) can be frequency-dependent or broadband (equal for all frequencies). The following discussion uses broadband gains for illustrating the operations.

On the output mix y(t) (104) further post-processing can be applied, such as loudness normalization, dynamic range compression, or applying equalization.

The signals are here discussed as they were real-valued time signals, but the same problem could be formulated in the time-frequency domain, e.g., Short-time Fourier Transform (STFT) domain.

3.3 Control

The remixing gains 124 are in general computed based on features (metrics) of the input signals ŝ(t) (112) and x(t) 102 (and/or potentially of b̂(t) 112) along with a criterion, and parameters that define the desired features of the output mixture y(t). These parameters can be user-defined or fixed by one or more presets.

A prominent feature (metrics) is (or is associated to) the intensity of the signals (which may be the absolute metrics 4141 and 4143). Different ways of quantifying the intensity of a signal can be used here, with different computational requirements. These are for example:

- the power of a signal;
- the power of a filtered signal where the filtering mimics the frequency selective sensitivity of the human ear;
- or a computational model of loudness.

Another important feature (metrics) is the intensity difference between signals (relative metrics 4145 and/or 4146). Different ways of quantifying the intensity difference exist and are applicable for the proposed method. These may be for example:

- the SNR (e.g. ratio between intensity of the foreground 114 and the intensity of the background 112);
- the loudness difference, where the loudness is computed, e.g., according to [9];
- or the partial loudness of the target signal when presented in a mixture as computed with a partial loudness model [10].

From our experience, it is particularly useful to set condition on the minimum intensity difference (also referred as clearance), leaving the input mix 102 unchanged if the estimated intensity difference in it is already big enough.

As an example for the control criterion for computing the remixing gains, let us set a specific value C (target clearance 339 in FIG. 3) as the desired minimum output SNR (e.g. C corresponds to a high SNR so that the target speech 114 is clear and intelligible; see also reference numeral 42 in FIG. 2), e.g. together with the additional condition (which may be optional) that the input mixture 102 shall not be modified when the power of ŝ(t) (target signal 114) is below a certain threshold G (e.g., preventing modification to the original mixture in passages where the target speech is not active).

Considering Eq. (2) (formula (2)), the output SNR between the target source signal and the residual signal in the output mixture after applying the remixing gains can be estimated as:

$$SNR_{out}(t) = w\left(\frac{\|h(t)\hat{s}(t)\|^2}{\|g(t)\hat{b}(t)\|^2}\right), \tag{3}$$

where w(·) is an optional frequency weighting, e.g., k-weighting [9]. For the sake of clarity, we can set h(t)=1 and ignore w(·):

$$SNR_{out}(t) = \frac{\|\hat{s}(t)\|^2}{\|g(t)\hat{b}(t)\|^2}, \tag{4}$$

from which it is clear that $SNR_{out}(t)$ can be controlled by g(t).

Our example control criteria needs to find g(t) such that $SNR_{out}(t)>C$ (clearance condition), together with the condition that that g(t)=1 if the intensity of ŝ(t) is below a certain threshold G, i.e., $\hat{I}_s(t)<G$ (gating condition or intensity condition). A time-varying, signal-adaptive, broadband solution can be:

$$\begin{cases} g(t) = 1, \text{ if } SNR_{in}(t) > C \text{ or } \hat{I}_s < G \\ g(t) = \sqrt{\dfrac{SNR_{in}(t)}{C}}, \text{ otherwise} \end{cases} \tag{5}$$

(The solution according to formula (5) is substantially a solution which takes into account, for each time instant 401, only metrics 4141 and 4145 on values of that time instant, without taking into account different (future or past) values. The gating condition and/or the clearance condition may form or be comprised in the criterion condition).

The input SNR (also indicated with $SNR_i$ or $SNR_{in}$) can be estimated as:

$$SNR_{in}(t) = \frac{\hat{I}_s}{I_x - \hat{I}_s}. \tag{6}$$

If the temporal context would be ignored, the intensities $I_x$ and $\hat{I}_s$ could be computed as $I_x=w(x(t)^2)$ and $\hat{I}_s=w(\hat{s}(t)^2)$, however the temporal context 132 can be essential for the esthetical pleasantness of the final result. We may use the temporal context as detailed in Sec. 4. In fact, limitation, time integration, and smoothing may be applied on the remixing gains g(t) and/or on the involved signals (e.g., $\hat{I}_s$ and $SNR_{in}(t)$ also indicated with $SNR_i(t)$) so to avoid abrupt transitions and pumping, and to generally obtain a smooth and esthetically pleasing output mix.

The smooth gains generated by taking into account the temporal context 132 and the final esthetical pleasantness could be referred to as $g_{smooth}(t)$:

$$g_{smooth}(t)=\text{smooth}(g(t)) \tag{7}$$

It is possible that $g_{smooth}(t)$ do not strictly fulfill the criterion used for computing the first gains (rough gain) g(t), e.g., by not fulfilling the instantaneous SNR criterion (e.g. criterion condition) at locations in which large gain changes are smoothed over time (e.g. the above discussed second, intermediate region in FIG. 2, i.e. in the interval $t_{DS}$ and/or $t_{DR}$). However, our experience indicates that despite this, the temporally smoothed gains are favored by the listeners of the resulting mix.

Instead of $SNR_{out}(t)>C$ and $\hat{I}_s$ (which would be a criterion which does not take into account metrics 4146, 4143 on future or past time instants or time slots 403), estimates of the perceived momentary or short-term loudness (e.g., [9]) can be used as intensity measures for the control criteria. Preferences for loudness differences are investigated in [3, 4]. Other criteria can be based on a partial loudness model [10] or on time-dependent intelligibility or quality metrics, similarly to [11]. Also a voice activity detection could be usefully integrated, e.g., by replacing the gating condition $\hat{I}_s$<G with a condition based on speech presence probability.

Finally, it is possible to extend the solution of Eq. (5) to provide gains that are not only time-varying and signal-adaptive, but also frequency-varying.

Also, the control module could take $\hat{b}(t)$ instead of x(t) as input and similar results could be achieved. In other words, in addition to $\hat{s}(t)$, only one signal between x(t) and $\hat{b}(t)$ is needed for the Control module. Our preference is having access to x(t) (as in FIG. 1) instead of $\hat{b}(t)$, in particular if $\hat{s}(t)+\hat{b}(t)\neq x(t)$. This preference is motivated by the fact that x(t) could be used, e.g., as quality reference (as mentioned in Sec. 4.1).

4 TEMPORAL CONTEXT

FIG. 3 illustrates main operations using the temporal context for producing $g_{smooth}(t)$ (also referred to with 124).

Control module in detail: Operational block diagram of an example of the usage of temporal context for producing $g_{smooth}(t)$.

4.1 Content Classification and Parameter Adjustment

A non-essential part of the proposed method contains the automatic adjustment of one or more of the operational parameters of the method, e.g., "Target clearance", "Attack", or "Release". This can be based on the classification of the non-speech parts of the input mix x(t), e.g., if these are dominated by music content or by ambient noise and effects. This information can be used to adjust the "Target clearance 339" accordingly, e.g., to a different value as suggested by the findings in [3, 4].

Another option is to adjust the remixing parameters based on a quality estimate of the separation. Such an estimate can be done based on $\hat{s}(t)$ (114) and x(t) (102), as presented in [12] or based on deep neural networks (DNNs), similarly to [11]. E.g., if the separation quality is low (e.g., because of challenging input mix 102), the smoothing parameters can be set to be more conservative and a smaller clearance can be selected.

The Content classification and Parameter adjustment functionalities are not required for the basic operation of the proposed method, but the parameters can be adjusted also manually or fixed by constant presets. However, a classifier 52 may classify a content of the signals 114 and/or 102 and/or 112. For this purpose, the classifier 52 may have a class determiner 54 which, for example, distinguishes a first class from a second class, for example speech from non-speech, music or other tonal noises from transient events, whereby both a class of the noises and a number of differentiated classes can be arbitrary. The class determiner 54 may provide the determined class to a parameter adjuster 58 by means of a class determination signal 56. The classifier 52 may be configured to set at least one parameter of the combining and/or the signal attenuation based on a result of the classification. The parameters set by means of the parameter adjuster 58 can thus relate to any further operation of the device 40.

4.2 Short-Term Level Estimations

In a first stage, the temporal context 132 may be used for smoothing the intensities of the inputs $\hat{s}(t)$ (114) and x(t) (102, or more in general the first signal 302). Let us consider the input intensity of x(t) (same operations hold for $\hat{s}(t)$). As already mentioned, one way to quantify the intensity of x(t) is to compute the power of the signal filtered so to mimic the frequency response of the human ear: $I_x(t)=w(\|x(t)\|^2)$. This is smoothed, e.g., with a first-order infinite impulse response, IIR, filter:

$$I_{x,smooth}(t)=\alpha I_{x,smooth}(t-1)+(1-\alpha)I_x(t), \tag{8}$$

where α is a feedback coefficient, e.g., computed from a smoothing time-constant. The smoothed estimate 314, 312 can be further transformed into a logarithmic domain to better reflect the magnitude response of the human auditory system. This is referred to as $E_x(t)$ for the input signal 102 (or more in general the first signal 302) and as $\hat{E}_s(t)$ for the target source signal 114.

4.3 TAD (Target Activity Detection)

The smoothed intensity estimates are used for a simple level-based activity detection. A gate signal 320 is produced, signaling if $\hat{E}_s(t)$ is big enough in absolute terms, i.e., it is bigger than an absolute threshold and in relative terms, i.e., compared to $E_x(t)$ with a relative threshold.

More in general, the gate signal 320 may represent a short-term activity detection, which indicates the activity of the target signal 114 but which may be modified by taking into account the temporal context, for example.

The parameters 315 and 316 may be an absolute threshold (e.g. so-called "absolute gate", and also indicated with G) and/or a relative threshold (e.g. so-called "relative gate", which is optional).

4.4 Utterance Integration (UI) (e.g. Block 330)

If the target source 114 is speech, it has to be observed that people tend to talk louder during the first syllables of an utterance. This means that $\hat{E}_s(t)$ is higher in the utterance beginning compared to the rest of the utterance. Assuming a constant level or the background sources, the effect on the gain is that in the beginning of the utterance less background attenuation is needed than later on and the attenuation changes gradually over time to more attenuation. This "creeping" background attenuation is perceived esthetically rather unpleasing.

UI (e.g. at block 330) takes as the input the TAD output gate signal 320 and the two initial signal level estimates $\hat{E}_s(t)$ and $E_x(t)$ (314 and 312).

UI implements a sliding window mean computation applied on the linear-domain level estimates before transforming them back in the logarithmic domain. The computation has two main modes of operation: start of utterance and sliding. The more interesting is the first one:

- When the TAD gate signal (e.g. 320) indicates activity, cumulative sums of the power-domain levels are built.
- (Optional) When the activity turns off, a counter is used to determine if the gap to the next detected activity is short enough to be ignored. This increases the robustness against the noisy initial level estimates and noisy TAD result.
- When the activity turns off, (either a too long gap or the gap ignoring is disabled), the cumulative sum is divided by the number of elements in the sum, and this result is used as the level estimate for the entire duration from the beginning of the utterance until this location.
- When the number of elements in the cumulative sum reach the pre-defined Activity integration time (e.g. 329) defining the size of the window, e.g., 1.5 s:

The mean of the sum elements is computed and this is used as the level estimate for all the time indices within the window until here.

The operation mode switches to the sliding mean mode: the cumulative sum is updated by removing the oldest value and adding the newest value.

The mean of the sum elements is computed and this is used as the output value for the current time index. This is repeated until the activity is not active anymore.

A benefit of this processing is that the level estimate remains constant during the start of an utterance and also later on it changes more slowly. The constant level estimate results into a more consistent gain value and avoid the “creeping gain” problem, making the output esthetically much more pleasant. The output of UI may be refined level estimate $\hat{E}_s(t)$ and $\hat{E}_b(t)$. The later may be used, for example, to obtain at least one of the metrics 4141, 4143, 4145, 4146.

The window is also called “filtering window” and may make use of values of any of the signals 114, 302 (112, 102) or their processed versions (314, 312) to obtain filtered versions 334 and 332 of those signals (334 is the filtered version of 114 or 314; 342 is the filtered version of 302, e.g. 102, 112, or the processed version 312. A filtering window for the determined current time instant or time slot 401 could be, for example, represented by the union of the pluralities of future and past samples 406 and 407.

4.5 TAD Refinement (Block 338)

Since the intensity estimates are now temporally more stable, it is beneficial to refine the TAD processing, similarly to Sec. 4.3. A long-term activity detection 342 (here considered a gate signal, e.g. a binary signal) is therefore obtained.

The parameters 315 and 316 may be an absolute threshold (e.g. G, “absolute gate”, which may be the G of formula (5)) and/or a relative threshold (relative gate, optional).

4.6 Gain Computation and Gating

The core of the gain computation can be now carried out as explained in Sec. 3.3 (see in particular Eq. 5) and by using the stable and smooth intensity estimates and the gate signal obtained so far. The output is g(t), which undergoes a temporal smoothing as explained in the following.

4.7 A/R-Smoothing

The temporal smoothing can be implemented in various ways, but we may use a simple first-order IIR-filtering approach as an example (other techniques may be implemented). The control inputs to the smoothing method are attack time (357) $t_{att}$ (e.g. corresponding to the ramp 2112 and to the transition from the first remixing criterion to the second remixing criterion), release time (358) $t_{rel}$ (e.g. corresponding to the ramp 2113 and to the transition from the second remixing criterion to the first remixing criterion), and hold look-ahead time $t_{holdahead}$ (359). The first two time constants define feedback coefficient values through $$\tau_{att}=1-e^{-1/t_{att}} \tag{9}$$

for the attack, and similarly for the release. Other translation formulas may also be used and these are only exemplary. The basic attack/release smoothing produces the smoothed gains:

$$g_{smooth}(t)=(1-\tau(t))g_{smooth}(t-1)+\tau(t)g(t), \tag{10}$$

where $$\begin{cases} \tau(t)=\tau_{att}(t) & \text{if } g_{smooth}(t-1)>g(t) \\ \tau(t)=\tau_{rel}(t), & otherwise \end{cases}. \tag{11}$$

4.8 Adaptive Look Ahead

A problem with this smoothing is that if there is a short pause in the target source signal 114, e.g., between words, sentences, or talkers, the attenuation gain starts the release phase, the background signal comes (partly) back up before being attenuated again when the speech continues. An attempt to solve this pumping problem in the earlier works is to use a constant hold time which delays the release phase with a constant amount. A drawback of this is that the release is delayed, regardless if the need for background attenuation continues or not. This can cause unpleasant gaps after the target activity (i.e., speech) has ended. We propose a signal-adaptive mechanism of hold look-ahead for solving this problem: the smoothing uses a look-ahead buffer into the future and detects if the gain applies the same amount or more attenuation within the window of length $t_{holdahead}$. If this is the case, operation similar to normal hold is activated and the current gain value is kept, otherwise attack and release smoothing is performed normally. This process can be exemplified by surrounding Eq. 10 (formula (10)) with some additional logic:

$$g_{smooth}(t)=\begin{cases} g_{smooth}(t-1), & \text{if } c_{hold}(t)>0 \\ (1-\tau(t))g_{smooth}(t-1)+\tau(t)g(t), & \text{otherwise} \end{cases}. \tag{12}$$

where $c_{hold}(t)$ is a variable indicating the length of the still remaining time to keep the current gain value and it can be $$c_{hold}(t)=0 \text{ if } g_{smooth}(t-1)>g(t),$$

otherwise $$c_{hold}(t)=\max\{c_{hold}(t-1)-1,k_{min}(t)\},$$

where $k_{min}(t)$ indicates the location of the minimum gain value within a window of $t_{holdahead}$ future values if this value is smaller than the current smoothed value, e.g., $$k_{min}(t)=\arg\min\{g(t:t+t_{holdahead})\} \text{ if } \min\{g(t:t+t_{holdahead})\}<g_{smooth}(t-1),$$

otherwise $$k_{min}(t)=0.$$

See also FIG. 7. Alternative techniques may be implemented.

4.9 Offset (Look-Ahead or Shift)

The description so far is sample-synchronized in the sense that the potential background attenuation induced by applying the produced gains would start exactly at the same sample as the target becomes active. When this is combined with the attack/release-smoothing, the result is that the background attenuation may be perceived to start in a delayed fashion, i.e., too late. Additionally sometimes an earlier attack start of the attenuation is desired for esthetical reasons. A solution is to implement a temporal shift between the gain and the audio signals by shifting the gains by some small time, look-ahead or shift. This operation may conclude the generation of $g_{smooth}(t)$.

In the case of shifting being used, FIG. 2 shows the evolution of the at least one gain 125 and of the background signal 112 after having applied shifting 8 (e.g. at the end of method 500 and/or 600). In the case of the descending ramp 2112, the shifting may move the background signal 112 towards the past, e.g. by a first shifting amount (which in this case could be $t_{OA}$). In the case of the ascending ramp 2113, the shifting may move the background signal 112 towards the past, e.g. by a second shifting amount. The first shifting amount, for shifting from the first criterion to the second criterion (e.g. when attenuating the background noise), may be different from (e.g. shorter than) the second shifting amount, for shifting from the second criterion to the first criterion (e.g. when the speech ends), but in some other examples the shifting amount may be the same for all the time instants, and a coherent shifting may be applied to all the time instants. In this latter case, it is simply possible to assign an obtained gain $g_{smooth}(t)$ to a time instant in the past t−Sh (where Sh is a constant number of time instants or time slots, e.g. Sh=100 or another number e.g. between 50 and 250), and therefore it is obtained (e.g. at post processing) that the remixing gain provided to the remixing block 150 is $g_{smooth}(t-Sh)$, basically operating a coherent translation towards the past of the obtained at least one gain. In the examples in which there is a different shifting amount between when deviating from the first criterion towards the second criterion and when deviating from the second criterion towards the first criterion, the different shifting amounts may be predefined, e.g., stored in a storage unit: the first shifting amount (e.g. Sh1) will be applied when the transition is from the first criterion towards the second criterion, and the second shifting amount (e.g. Sh2) will be applied when the transition is from the second criterion towards the first criterion. More in general, when shifting is performed, the remixing criteria and the rough gains may be understood as also being shifted towards the past for the same shifting amounts. When shifting is performed, the determined current time instant or time slot may also have the temporal context information 132, which is in the past or in the future with respect to the determined current time instant or time slot before shifting. Subsequently, the obtained gain 124 ($g_{smooth}(t)$) may be shifted towards the past by the shifting amount (e.g. Sh, Sh1, Sh2).

In addition or alternatively, it is possible to start the ramp directly based on the temporal context information (e.g., by knowing that in the future there is a change of criterion, it is possible to start the deviation).

5. RELATED WORKS

A (possibly incomplete) list of related works is reported in the following, pointing out commonalities and differences with the approach proposed in this report.

5.1 Remixing Separated Sources without Signal-Adaptive Control

[13] Polyphonic music signals are used for creative and restorative remix of separated stereo signals (instruments) in a polyphonic mix. Source separation is supported by musical score information. Manual remix approach: "... so that audio effects, equalization and volumes can be altered on an instrument-by-instrument basis." Not an automatic approach.

[14] Separated vocals of polyphonic music signals. Manual remix approach. "For each of the six selected songs, we generated three reference mixes by adjusting the level of the vocals, relative to the level as set by the mixing engineer, by 0 dB, 6 dB, or 12 dB before summing all four sources." Mix presets.

[15] A perceptual test is proposed where subjects interact with a user-adjustable system. The application of remixing separated sources for dialog enhancement is considered. Constant gains (independent of time and signal features) are considered.

[16] A dialog enhancement system including remixing is proposed. The remixing gain (dialog boost factor) is set by the final user and it is not automatically generated.

5.2 Remixing Separated Sources with Some Degree of Signal-Adaptive Control

[11] A system similar to FIG. 1 is proposed, but time-varying remixing is not considered. Moreover, as control criteria, an estimate of the audio quality based on deep learning is used in [11], while in this report criteria as simple as SNR(t) are proposed.

6 OBTAINED ASPECTS

Some advantageous aspect of the present examples are here below briefly resumed:

1. A system comprising 3 modules (see FIG. 1):
   - A source separation module, e.g., based on deep neural network (DNN) or classical signal processing, producing separated source signals;
   - A control module analyzing the separated target source signals and one between the input mixture (advantageous) and the separated background source and generating time-varying, signal-adaptive gains; including a mechanism to take into consideration the temporal context, e.g., by buffering, look-ahead, temporal integration, and smoothing, and using this information in its operation as opposed to operating on instantaneous values without contextual information;
   - A remixing module applying the produced gains to the separated source signals (linear combination).
2. The control module may generate time-varying (and possibly also frequency-dependent) gains so to create an alternative mix, in response to the input signals. The output mix has to be smooth and esthetically pleasing and it has to meet a specific criterion based on the analysis of the separated sources. The criterion can be met by applying remixing gains.
3. The criterion that the output mix has to meet is defined based on time-dependent features of the separated sources, e.g.:
   - The absolute intensity of the separated source signals, possibly frequency-weighted;
   - The (frequency-weighted) relative intensity of the separated source signals, e.g., SNR(t);
   - An estimate of the perceived time-varying loudness and/or loudness difference;
   - A time-dependent quality or intelligibility metric or a speech activity probability;
   - A combination of these or other time-dependent features of the separated signals.
4. Optionally, an additional constant (over time) signal-independent gain can be applied on one or both separated source signals before or after the signal-adaptive remixing.

5. Optionally, a post-filtering is applied on the separated source signals before or after remixing, e.g., equalizing (EQ) or musical noise reduction.
6. Limitation, temporal integration, and smoothing can be applied on the remixing gains or on the features used for their calculation so to make the output mix esthetically pleasing and avoid abrupt changes. It is possible that this prevents strictly fulfilling the remixing criterion.
7. The modules of FIG. 1 can be distributed in multiple physical devices. For example, in an encoder-decoder architecture, the remixing module can be placed in the decoder. This means that encoding, transmission, and decoding (of the separated sources and/or of the remixing gains) can take place before or after the remixing module.

7. VARIANTS AND FURTHER ASPECTS AND EXAMPLES

Present examples mainly refer to a system (e.g. 100) for processing audio signals. The system (e.g. 100) may comprise a source separation block (e.g. 110) estimating, from an input signal (e.g. 102) which evolves in time along a discrete succession of time instants or time slots (e.g. 401, 403), a target signal (e.g. 114) and at least one residual signal (e.g. 112) to be subsequently remixed (e.g. at remixing block 150, which is part or not part of the system 100) according to at least one remixing gain (e.g. 124) variable along the discrete succession.

The system 100 may comprise a control block (e.g. 120) determining, for a determined current time instant or time slot (e.g. 401), at least one metrics (e.g. one of an absolute metrics 4141 and a relative metrics 4145) on the target signal (e.g. 114, 1141), or a processed version (e.g. 314, 334) of the target signal (e.g. 114, 1141), in the determined current time instant or time slot (e.g. 401). The at least one metrics (e.g. one of an absolute metrics 4141 and a relative metrics 4145) may e.g., be, or be based on at least one relative metrics (e.g. 4145) between the target signal (e.g. 114, 1141), or a processed version (e.g. 314, 334) of the target signal (e.g. 114, 1141), and the input signal (102, 1121), or a processed version (e.g. 312, 332) of the input signal, or the at least one residual signal (112, 1121), or a processed version (312, 332) thereof, in the determined current time instant or time slot (401). The at least one metrics may be a relative metrics (e.g. 4145). For example the at least one relative metrics may be, or be based on, the $SNR_{in}$ (e.g. signal-to-noise ratio) of the input signal (e.g. 102) or of the processed version thereof (e.g. 314 and/or 334). The $SNR_{in}$ (e.g. signal-to-noise ratio) may be, or be associated to, a relative intensity between the target signal (e.g. 114) and the input signal (e.g. 102, 1121), or a processed version (e.g. 312, 332) of the input signal, or the at least one residual signal (e.g. 112, 1121), or a processed version (e.g. 312, 332) of the at least one residual signal. Examples are provided in formulas (5) and (6). For example, according to formula (6) (see also above)

$$SNR_{in}(t) = \frac{\hat{I}_s}{I_x - \hat{I}_s},$$

where the $I_x$ and $\hat{I}_s$ are intensities (or weighted versions of intensities) of the input signal 102 (or or a processed version (e.g. 312, 332) of the input signal) and of the target signal 114 (or processed version thereof). In some examples, numerals 334 and 332 of FIG. 3 are intensities.

The system 100 may comprise a temporal context block (e.g. 130). The temporal context block (e.g. 130) may, for example, perform at least one of the operations:

- determine temporal context information (e.g. 132, 370, 372) based on at least one metrics (e.g. a relative metrics 4146 and/or an absolute metrics 4143) on the target signal (e.g. 114, 1143), or a processed version (e.g. 314, 334) thereof, in at least one future time instant or future time slot; and
- determine temporal context information (e.g. 132, 370, 372) based on at least one metrics (e.g. a relative metrics 4146 and/or an absolute metrics 4143) on the target signal (e.g. 114, 1143), or a processed version (e.g. 314, 334) thereof, in at least one past time instant or past time slot.

Therefore, at least one future time instant and at least one past time instant (or at least one of them) may be determined at the temporal context block (e.g. 130). The at least one future time instant or time slot (e.g. 403, 406, 416 or one in a window, such as a window 417, 407, 416, 426, etc.) may be, in the discrete succession, after the determined current time instant or time slot (e.g. 401). The past time instant or time slot (e.g. 425, or in a window 407, 417) may be, in the discrete succession, before the determined current time instant or time slot. The temporal context information (e.g. 132) may, for example, be or be based on or at least include at least one metrics on the target signal in at least one future time instant and/or at least one past time instant (e.g. at least one relative metrics 4146, at least one absolute metrics 4143, or both). The temporal context information (e.g. 132) may, for example, be or be based on or at least include a previously obtained remixing gain (in some examples it may be at least one previously obtained rough remixing gain g(t) e.g. in the future time instants; in some examples it may be at least one previously obtained smoothed, final remixing gain $g_{smooth}(t)$, and in some other examples it may comprise both, or be, at least one previously obtained rough remixing gain, e.g. in the future time instants, and at least one previously obtained smoothed, final remixing gain $g_{smooth}(t-1)$, e.g. for a preceding time instant or time slot).

The control block (e.g. 120) may be configured to generate at least one remixing gain associated to the determined current time instant or time slot by (e.g. 401, t) considering:

- the at least one metrics (e.g. relative metrics 4145 and/or the absolute metrics 4141) in the determined current time instant or time slot (401, t); and
- the temporal context information 130 (e.g. one of the information 132, 370, 372, g(t) for t in the future with respect to the current time instant or time slot, of the immediately preceding time instant or time slot t−1, etc.).

The at least one remixing gain may for example be obtained after having compared the relative metrics (e.g. $SNRi_{in}$) with a threshold (e.g. C, 339). In some examples (e.g. in the example of formula (5)), if the relative metrics (e.g. 4145) is below the threshold (e.g. $SNRi_{in}<C$), then there is defined a gain g(t) (e.g. rough gain) such that the distance between the level of the target signal (or processed version thereof) and the level of the level of the input signal (e.g. 102, 1121), or a processed version (e.g. 312, 332) of the input signal, or of the at least one residual signal (e.g. 112, 1121), or a processed version (e.g. 312, 332) of the at least one residual signal, is increased (e.g. up to C or at least C, e.g. reaching the target clearance 42), e.g. by attenuating the at least one residual signal (e.g. 112), or processed version of the at least one residual signal, and/or by boosting the target signal, or the processed version thereof. If the relative metrics (e.g. $SNRi_{in}$) is over the threshold (e.g. $SNR_{in}>C$), then the rough remixing gain g(t) may be maintained as the input gain (e.g. g(t)=1), since the minimum distance C (e.g. target clearance) is already obtained. Once the rough gain g(t) is obtained, it is possible to modify it by taking into account the temporal context information 132. For example, a smoothed version of the remixing gain $g_{smooth}(t)$ may be obtained when, from the temporal context information 132, variations of the (e.g. rough) gain in subsequent time instants are determined. For example, if the subsequent time instants are all (or at least prevalently) associated to a different (e.g. rough) gain (e.g. to the attenuating gain), then the rough gain may be modified so as to slightly fade towards the different gain.

In some examples, there are defined at least one first remixing criterion (e.g. implying g(t)=1) and one second remixing criterion (e.g. implying $$g(t)=\sqrt{\frac{SNR_{in}(t)}{C}}$$

or in any case implying a g(t) which is less than the g(t) at the first remixing criterion) for generating the rough remixing gain (e.g. at the particular determined current time instant t). At least one criterion condition (e.g. a comparison between a relative metrics, e.g. $SNR_{in}(t)$, and a predetermined threshold, e.g. C) may therefore be defined to perform a discrimination between using the first remixing criterion and using the second remixing criterion at each time instant or time slot. In some examples there may be, in addition or alternative, also a comparison between an absolute metrics, such as an intensity $\hat{I}_s(t)$ of the target signal s(t) with another threshold G, so that if $\hat{I}_s(t)<G$, then the rough remixing gain is chosen to be unitary g(t)=1, otherwise $$g(t)=\sqrt{\frac{SNR_{in}(t)}{C}}$$

if $\hat{I}_s(t)>G$ (e.g. attenuated background); in some examples (like in formula (5)), both the criterion conditions may form one OR-condition based on both a first condition (comparison of $SNR_{in}$ with C, or another relative metrics) with a first threshold (C, 339) and another second condition (comparison of intensity $\hat{I}_s(t)$, or another absolute metrics 4141, with a second threshold, e. g. G, e.g. 315). Therefore on the at least one criterion condition, each time instant or time slot is associated to one of the at least one first remixing criterion and second remixing criterion (e.g. for a first time instant t1 it may be that g(t1)=1 and for a second time instant t2 it may be that $$g(t2)=\sqrt{\frac{SNR_{in}(t2)}{C}},$$

this being decided through the evaluation of the criterion condition on the relative metrics and/or the absolute metrics). Hence, at least one criterion condition may be a condition on the at least one (relative and/or absolute) metrics on at least the target signal, or a processed version thereof, at the determined current time instant or time slot, or on information obtained from the at least one metrics on the at least the target signal or a processed version thereof. The determined current time instant or time slot is associated to one of the at least one first remixing criterion and one second remixing criterion based on the metrics on the target signal, or a processed version of the target signal, in the determined current time instant or time slot.

The system may also obtain (e.g. determine) the at least one remixing gain (e.g. in smoothed version in some examples, which is also indicated with $g_{smooth}(t)$) for the determined current time slot or time instant (t) by considering temporal context information 132 so as to deviate, from the at least one rough remixing gain, based on a deviation obtained from the temporal context information 132. In some examples, by being known that the next future time instants or time slots (totally or partially in a subsequent time window) the rough remixing criterion $g(t+\Delta t)$ will be different, then some deviations may be possible. It is possible to understand that the deviations permit to obtain a graceful transition from a remixing gain implied by a remixing criterion to another remixing gain implied by another remixing criterion. Examples of deviations are proposed in formulas (10) and (12). It is possible to correct the rough remixing gain (125) by an amount associated to a previously obtained remixing gain for a time instant or time slot preceding the determined current time instant or time slot; this means that the already obtained remixing gain. E.g., in one example at the preceding time instant or time slot t−1 a remixing gain $g_{smooth}(t-1)$ has been obtained, and at time instant or time slot t the remixing gain $g_{smooth}(t)$ may be obtained by correcting the at least one rough remixing gain (125) by an amount associated to a previously obtained at least one remixing gain (e.g. $g_{smooth}(t-1)$ for a time instant or time slot (e.g. 425) preceding the determined current time instant or time slot, like in formulas (10) and (12). It is possible, in addition or alternative, to correct the at least one rough remixing gain g(t) through a linear combination of the through remixing gain obtained (e.g. through the evaluation of the criterion condition applied to the relative and/or absolute metrics) for the present current time slot or time instant t and the remixing gain ($g_{smooth}(t-1)$) obtained for the preceding time slot or time instant t−1. Therefore, by taking into account the temporal context information 132 (comprising e.g. information such as $g_{smooth}(t-1)$, which is information on the past, and/or information such as the rough gain for subsequent time slots or time instants, which is information on the future) it is possible to properly deviate from the remixing criterion defined by evaluating the criterion condition.

In some examples, the deviation from the rough remixing gain (e.g. g(t)) by correcting the at least one rough remixing gain (e.g. g(t)) for a gain amount associated to a previously obtained remixing gain (e.g. $g_{smooth}(t-1)$) for a time instant or time slot (e.g. t−1) preceding the determined current time instant or time slot (e.g. t) may be subjected to the fulfilment of a deviation condition. The deviation condition may also be based on the temporal context information 132. In this case, the temporal context information 132 may include information on rough remixing gains already obtained for time instants or time slots following the determined time instant or time slot (e.g. in a time window from t, or t+1, to $t+t_{holdahead}$, or in some examples another window which is not immediately subsequent to the current time instant or time slot t). The deviation condition may be fulfilled e.g. when a predetermined number (e.g., according to examples, the a predetermined number, or the majority, or all) of rough remixing gains already obtained for time instants or time slots (e.g. in the time window from t, or t+1, to $t+t_{holdahead}$) following the determined time instant or time slot (e.g. t) are associated to a remixing criterion which is different from the remixing criterion of the time instant or time slot preceding the current determined time instant or time slot (or a time instant or time slot preceding the time instants or time slots in the time window following the determined time instant or time slot, such as one of the two time instants or time slots, like t−1 and t, immediately preceding the time instants or time slots in the time window following the determined time instant or time slot, e.g. one of the current determined time instant or time slot and the time instant or time slot preceding the current determined time instant or time slot), and otherwise the deviation condition is not fulfilled. If the deviation condition is satisfied, then the deviation is carried out. Otherwise the remixing gain (e.g. g(t)) for the determined current time instant or time slot (e.g. t) may be maintained the same of the at least one remixing gain for a time instant or time slot (e.g. t−1) preceding the determined current time instant or time slot (e.g. t). For example, if only a low number of subsequent time instants (e.g. in the window from t, or t+1, to $t+t_{holdahead}$) is assigned to a different remixing criterion, then the deviation is not performed, but if a great number (e.g. all in some examples) of subsequent time instants (e.g. in the window from t, or t+1, to $t+t_{holdahead}$) is assigned to a different remixing criterion, then the deviation is performed. Therefore, disturbance may be tolerated.

In some examples, one remixing criterion may be dominant over another criterion. In some examples the remixing criterion according to which the residual signal 112 is attenuated (e.g. when $$g(t)=\sqrt{\frac{SNR_{in}(t)}{C}})$$

may be dominant over the remixing criterion according to which the residual signal 112 is not attenuated (e.g. when g(t)=1). This because it has been understood that this is advantageous, e.g. when the target signal 114 is speech and the residual signal 112 is noise, so as to avoid an abrupt increase of noise e.g. between two words.

It is to be noted that the system 100 may have or may not have the remixing block 150, according to the examples. The remixing block 150 may simply receive the target signal 114, and residual signal 114 (or the input signal 102) together with the remixing gain (e.g. $g_{smooth}(t)$), and the remixing block 150 will apply the remixing gain (e.g. $g_{smooth}(t)$) to the signal (e.g. to the residual signal).

However, in some examples the remixing gain (e.g. $g_{smooth}(t)$) is not necessarily to be applied to the signal (e.g., input signal 102, target signal 114, or residual signal 112) at the same time t for which it has been obtained. Indeed, the system 100 may shift the at least one remixing gain ($g_{smooth}(t)$) as obtained for each time instant or time step of the discrete succession of time instants or time slots by a predetermined number of time instants or time steps towards the past. For example, the remixing gain $g_{smooth}(t)$ may be assigned to $g_{smooth}(t-D)$, where D is a predetermined number of time slots or time instants. Hence, a better smoothing may be obtained.

Some additional variants and/or additional or alternative aspects and/or examples are discussed here below.

The gain computation block 340 provides at least one gain according to a second criterion (e.g., in the low gain region 200H2 in FIG. 2). The gate 342 may permit to discriminate between the first criterion and the second criterion, the first criterion providing a unitary gain for both the target signal 114 and the background signal 112.

While there is no ramp 2112 and 2113 obtained, notwithstanding, the utterance integration block 330 may permit to maintain the low gain for the background level 112. This is because the utterance integration block 330 has the possibility of looking in the future with the temporal context information 372 (132), which provides metrics 4146 and/or 4143 regarding future time instants or time slots 403 (or more in detail, a window 406 or 416 of future time instants or time slots). It is also possible to take into consideration past time instants or time slots, such as those in the window 407 or 417 immediately preceding the determined current time instant or time slot 401. The utterance integration, therefore, permits to maintain the level at the criterion established for the dominant second remixing criteria at the expense of the non-dominant first remixing criterion. A possibility is provided when transitioning from the second criterion to the first criterion. Other examples may also completely avoid the utterance integration.

Another example is provided by avoiding the utterance integration 330 and the short term TAD block 318, but maintaining the blocks 340, 348, 350, and 360, for example. Also in this case, it is possible to obtain a soft transitioning between the two remixing criteria. Information from the future (part of the temporal context information) may also indicate the start of the ramp 2112 and 2113 at time instants $t_A$ and $t_R$.

In some cases, it is possible (e.g., when the information from the future does not provide the time in the instant in which the ramp shall be started) that the gates 124 as provided could, for example, be shifted by a predetermined amount towards the past. However, in some examples, this could be post-processing operation down streamed to block 360 (but up streamed to the remixing block 150).

Upstream to the remixing block 150, it is possible to encode a bitstream encoding the target signal (114), or a processed version (314, 334) thereof, and the at least one residual signal (112), or a processed version (312, 332) thereof, or input signal (102), or a processed version (312, 332) thereof, and the at least one gain (124). The bitstream may be stored and/or transmitted (e.g., through electric or wireless transmissions media) and may be subsequently received, read and decoded upstream to the remixing block 150.

Additionally or alternatively upstream to the control block 120, it is possible to encode a bitstream encoding the target signal (114), or a processed version (314, 334) thereof, and the at least one residual signal (112), or a processed version (312, 332) thereof, or input signal (102), or a processed version (312, 332) thereof. The bitstream may be stored and/or transmitted (e.g., through electric or wireless transmissions media) and may be subsequently received, read and decoded upstream to the control block 120.

Basically, any of blocks 110, 120, 130, 150, may be separated from the other ones or may be in the same device of at least one of the other ones.

Here above reference is often made to the at least one remixing gain mostly using examples in which the gain g(t) (in its rough version) or $g_{smooth}(t)$ (in its corrected, deviated version) is the remixing gain to be applied to the background noise 112 (b(t)). Notwithstanding, it is also possible to apply a gain h(t) (in its rough version) or $h_{smooth}(t)$ to the target signal 114 (s(t)). The at least one gain (either in its rough version or in its smoothed version) may also comprise both the remixing gain to be applied to the background noise 112 (b(t)) and the gain h(t) (in its rough version) or $h_{smooth}(t)$ to the target signal 114 (s(t)) and may therefore be formed e.g. by a 2-elements vector.

In some examples, we will have that a second ratio (which may be $1/g_{smooth}(t)$, e.g. obtained at the second remixing criterion, when the background signal 112 is attenuated) between the rough remixing gain associated to the target signal (which may be 1) and the rough remixing gain (which may be $g_{smooth}(t)<1$) associated to the input signal (or processed version thereof) or the target signal (or processed version thereof) may be higher than a first ratio (which may be 1, e.g. obtained at the first remixing criterion, e.g. non-attenuating the background signal) between the rough remixing gain (which may be 1) associated to the target signal and the rough remixing gain (which may be 1) associated to the input signal (or processed version thereof) or the target signal (or processed version thereof). During the transitional periods, the ratio may be moved from the first ratio to the second ratio, or vice versa.

The examples above also refer to a method for processing audio signals, comprising:

- a source separation step obtaining, from an input signal evolving in time along a discrete succession of time instants or time slots, a target signal and at least one residual signal to be subsequently remixed according to at least one remixing gain variable along the discrete succession;
- a control step determining, for a determined current time instant or time slot, at least one metrics on the target signal, or a processed version thereof, in the determined current time instant or time slot, wherein the at least one metrics includes at least one relative metrics between the target signal, or a processed version thereof, and the input signal, or a processed version thereof, or the at least one residual signal, or a processed version thereof, in the determined current time instant or time slot; and/or
- a temporal context step determining temporal context information based on at least one metrics on the target signal, or a processed version thereof, in at least one future and/or past time instant or time slot, the at least one future time instant or time slot being, in the discrete succession, after the determined current time instant or time slot, and the past time instant or time slot being, in the discrete succession, before the determined current time instant or time slot,
- the method including generating at least one remixing gain based on:
  - the at least one metrics in the determined current time instant or time slot; and
  - the temporal context information.

The examples above also refer to a non-transitory storage unit storing instructions which, when executed by a processor, cause the processer to process audio signals, according to:

- a source separation step obtaining, from an input signal evolving in time along a discrete succession of time instants or time slots, a target signal and at least one residual signal to be subsequently remixed according to at least one remixing gain variable along the discrete succession;
- a control step determining, for a determined current time instant or time slot, at least one metrics on the target signal, or a processed version thereof, in the determined current time instant or time slot, wherein the at least one metrics includes at least one relative metrics between the target signal, or a processed version thereof, and the input signal, or a processed version thereof, or the at least one residual signal, or a processed version thereof, in the determined current time instant or time slot; and/or
- a temporal context step determining temporal context information based on at least one metrics on the target signal, or a processed version thereof, in at least one future and/or past time instant or time slot, the at least one future time instant or time slot being, in the discrete succession, after the determined current time instant or time slot, and the past time instant or time slot being, in the discrete succession, before the determined current time instant or time slot,
- generating at least one remixing gain based on the at least one metrics in the determined current time instant or time slot; and the temporal context information.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some examples according to the invention comprise a data carrier having electronically readable control signals, which are capable of cooperating with a programmable computer system, such that one of the methods described herein is performed.

Generally, examples of the present invention may be implemented as a computer program product with a program code, the program code being operative for performing one of the methods when the computer program product runs on a computer. The program code may for example be stored on a machine-readable carrier.

Other examples comprise the computer program for performing one of the methods described herein, stored on a machine-readable carrier. In other words, an examples of the method is, therefore, a computer program having a program code for performing one of the methods described herein, when the computer program runs on a computer.

A further examples of the methods is, therefore, a data carrier (or a digital storage medium, or a computer-readable medium) comprising, recorded thereon, the computer program for performing one of the methods described herein. A further example is, therefore, a data stream or a sequence of signals representing the computer program for performing one of the methods described herein. The data stream or the sequence of signals may for example be configured to be transferred via a data communication connection, for example via the Internet. A further examples comprises a processing means, for example a computer, or a programmable logic device, configured to or adapted to perform one of the methods described herein. A further examples comprises a computer having installed thereon the computer program for performing one of the methods described herein.

In some examples, a programmable logic device (for example a field programmable gate array) may be used to perform some or all of the functionalities of the methods described herein. In some examples, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

8. REFERENCES

[1] C. Simon, M. Torcoli, and J. Paulus, "MPEG-H Audio for Improving Accessibility in Broadcasting and Streaming," arXiv:1909.11549, 2019.

[2] J. Paulus, M. Torcoli, C. Uhle, J. Herre, S. Disch, and H. Fuchs, "Source separation for enabling dialogue enhancement in object-based broadcast with MPEG-H," Journal of the Audio Engineering Society, Special Issue on Object-Based Audio, vol. 67, no. 7/8, pp. 510-521, 2019.

[3] M. Torcoli, A. Freke-Morin, J. Paulus, C. Simon, B. Shirley et al., "Preferred levels for background ducking to produce esthetically pleasing audio for tv with clear speech," Journal of the Audio Engineering Society, vol. 67, no. 12, pp. 1003-1011, 2019.

[4] D. Geary, M. Torcoli, J. Paulus, C. Simon, D. Straninger, A. Travaglini, and B. Shirley, "Loudness differences for voiceover-voice audio in tv and streaming," Journal of the Audio Engineering Society, vol. 68, no. 11, pp. 810-818, 2020.

[5] R. Hennequin, A. Khlif, F. Voituret, and M. Moussallam, "Spleeter: a fast and efficient music source separation tool with pre-trained models," Journal of Open Source Software, vol. 5, no. 50, p. 2154, 2020, deezer Research. [Online]. Available: https://doi.org/10.21105/joss.02154

[6] M. Torcoli, J. Herre, J. Paulus, C. Uhle, H. Fuchs, and O. Hellmuth, "The Adjustment/Satisfaction Test (A/ST) for the Subjective Evaluation of Dialogue Enhancement," in Proc. of 143rd Audio Engineering Society Convention, New York, USA, 2017.

[7] D. Wang and J. Chen, "Supervised speech separation based on deep learning: An overview," IEEE/ACM Transactions on Audio, Speech, and Language Processing, vol. 26, no. 10, pp. 1702-1726, 2018.

[8] Z. Rafii, A. Liutkus, F.-R. St¨ oter, S. I. Mimilakis, D. FitzGerald, and B. Pardo, "An overview of lead and accompaniment separation in music," IEEE/ACM Transactions on Audio, Speech, and Language Processing, vol. 26, no. 8, pp. 1307-1335, 2018.

[9] I. Recommendation, "ITU-R BS.1770-4," Algorithms to measure audio programme loudness and true-peak audio level, October 2015.

[10] B. C. J. Moore, B. R. Glasberg, and T. Baer, "A model for the prediction of thresholds, loudness, and partial loudness," J. Audio Eng. Soc, vol. 45, no. 4, pp. 224-240, 1997. [Online]. Available: http://www.aes.org/e-lib/browse.cfm?elib=10272

[11] C. Uhle, M. Torcoli, and J. Paulus, "Controlling the perceived sound quality for dialogue enhancement with deep learning," in Proc. of IEEE International Conference on Acoustics, Speech, and Signal Processing (ICASSP), 2019.

[12] M. Torcoli, "An improved measure of musical noise based on spectral kurtosis," in 2019 IEEE Workshop on Applications of Signal Processing to Audio and Acoustics (WASPAA), October 2019.

[13] J. F. Woodruff, B. Pardo, and R. B. Dannenberg, "Remixing stereo music with score-informed source separation." in ISMIR, 2006, pp. 314-319.

[14] H. Wierstorf, D. Ward, R. Mason, E. M. Grais, C. Hummersone, and M. D. Plumbley, "Perceptual evaluation of source separation for remixing music," in Audio Engineering Society Convention 143. Audio Engineering Society, 2017.

[15] M. Torcoli, J. Herre, H. Fuchs, J. Paulus, and C. Uhle, "The Adjustment/Satisfaction Test (A/ST) for the Evaluation of Personalization in Broadcast Services and Its Application to Dialogue Enhancement," IEEE Transactions on Broadcasting, vol. 64, no. 2, pp. 524-538, 2018.

[16] A. S. Master, L. Lu, H.-M. Lehtonen, H. Mundt, H. Purnhagen, and D. Darcy, "Dialog enhancement via spatio-level filtering and classification," in Audio Engineering Society Convention 149. Audio Engineering Society, 2020

The invention claimed is:

1. A system for processing audio signals, comprising:

a source separation block configured to estimate, from an input signal evolving in time along a discrete succession of time instants or time slots, a target signal and at least one residual signal to be subsequently remixed according to at least one remixing gain variable along the discrete succession;

a control block configured to determine, for a determined current time instant or time slot, a first, relative metrics which is a relative metrics on the target signal, in the determined current time instant or time slot, wherein the first, relative metrics compares a level of the target signal with a level of the at least one residual signal or the input signal, in the determined current time instant or time slot; and a temporal context block configured to determine temporal context information based on a second, relative metrics in at least one future and/or past time instant or time slot, the second, relative metrics comparing a level of the target signal with a level of the input signal or the at least one residual signal, in the at least one future and/or past time instant or time slot, the at least one future time instant or time slot being, in the discrete succession, after the determined current time instant or time slot, and the past time instant or time slot being, in the discrete succession, before the determined current time instant or time slot, wherein the control block is configured to generate at least one remixing gain associated to the determined current time instant or time slot based on:

the first, relative metrics in the determined current time instant or time slot; and the temporal context information.

2. The system of claim 1, wherein the temporal context information comprises the second, relative metrics in the at least one future and/or past time instant or time slot.

3. The system of claim 1, wherein the temporal context information comprises information on at least one previously obtained remixing gain.

4. The system of claim 1, further comprising a remixing block providing a remixed output signal 104 in which the target signal and the at least one residual signal are mixed together according to the at least one remixing gain.

5. The system of claim 1, wherein there are defined at least one first remixing criterion and one second remixing criterion for generating at least one rough remixing gain, the at least one rough remixing gain comprising a first rough remixing gain provided by the first remixing criterion and a second rough remixing gain provided by the second remixing criterion, the first rough remixing gain being higher than the second rough remixing gain, wherein at least one criterion condition performs a discrimination between using the first remixing criterion and using the second remixing criterion at each time instant or time slot of the discrete succession of time instants or time slots, so that, based on the at least one criterion condition, each time instant or time slot discrete succession of time instants or time slots is associated to one of the at least one first remixing criterion and second remixing criterion, wherein the at least one criterion condition comprises at least one condition on the first, relative metrics at the determined current time instant or time slot, so that the determined current time instant or time slot is associated to one of the at least one first remixing criterion and one second remixing criterion based on the first, relative metrics on the target signal in the determined current time instant or time slot, the first remixing criterion being assigned to the determined current time instant or time slot when the first, relative metrics is over a threshold, and the second remixing criterion being assigned to the determined current time instant or time slot when the first, relative metrics is below the threshold, wherein the system is further configured to obtain the at least one remixing gain for the determined current time instant or time slot by considering the temporal context information so as to deviate, from the at least one rough remixing gain, based on a deviation obtained from the temporal context information.

6. The system of claim 5, wherein the system is configured to deviate from the at least one rough remixing gain by correcting the at least one rough remixing gain by an amount associated to a previously obtained at least one remixing gain for a time instant or time slot of the discrete succession of time instants or time slots preceding the determined current time instant or time slot.

7. The system of claim 6, further configured to correct the at least one rough remixing gain through a linear combination of the at least one rough remixing gain and the previously obtained at least one remixing gain for the time instant or time slot of the discrete succession of time instants or time slots preceding the determined current time instant or time slot.

8. The system of claim 7, wherein the linear combination is based on a first predefined parameter comprised between 0 and 1, wherein the first predefined parameter scales the at least one rough remixing gain and a second predefined parameter between 0 and 1 scales the previously obtained at least one remixing gain for the time instant or time slot of the discrete succession of time instants or time slots preceding the determined current time instant or time slot, wherein the sum between the first predefined parameter and the second predefined parameter is 1.

9. The system of claim 5, wherein the system is configured to deviate from the at least one rough remixing gain by correcting the at least one rough remixing gain for a gain amount associated to a previously obtained at least one remixing gain for a time instant or a time slot of the discrete succession of time instants or time slots preceding the determined current time instant or time slot subjected to the fulfilment of a deviation condition based on the temporal context information, wherein the temporal context information comprises information on rough remixing gains already obtained for time instants or time slots of the discrete succession of time instants or time slots following the determined time instant or time slot;

wherein the deviation condition is fulfilled when a predetermined number of rough remixing gains already obtained for time instants or time slots of the discrete succession of time instants or time slots following the determined time instant or time slot are associated to a remixing criterion which is different from the remixing criterion of the time instant or time slot of the discrete succession of time instants or time slots preceding the current determined time instant or time slot, wherein, if the deviation condition is not fulfilled, the at least one remixing gain for the determined current time instant or time slot is maintained the same of the at least one remixing gain for the time instant or time slot of the discrete succession of time instants or time slots preceding the determined current time instant or time slot.

10. The system of claim 9, wherein the deviation condition is fulfilled when a predetermined number of rough remixing gains already obtained for time instants or time slots in a time window following the determined time instant or time slot is associated to a remixing criterion which is different from the remixing criterion associated to the time instant or time slot of the discrete succession of time instants or time slots preceding the current determined time instant or time slot, wherein, if the deviation condition is not fulfilled, the at least one remixing gain for the determined current time instant or time slot is maintained the same of the at least one remixing gain for a time instant or time slot of the discrete succession of time instants or time slots preceding the determined current time instant or time slot.

11. The system of claim 9, wherein the second remixing criterion is dominant over the first remixing criterion, and the deviation condition is evaluated when the time instant or time slot of the discrete succession of time instants or time slots preceding the current determined time instant or time slot is associated to the second remixing criterion, while the evaluation of the deviation condition is deactivated when the time instant or time slot of the discrete succession of time instants or time slots preceding the current determined time instant or time slot is associated to the first remixing criterion.

12. The system of claim 5, wherein the at least one criterion condition comprises a condition on the at least one first, relative metrics at the determined current time instant or time slot, so that:

if the first, relative metrics between the target signal and the at least one residual signal or input signal at the determined current time instant or time slot is greater than a predetermined relative threshold, then the determined current time instant or time slot is associated to the first remixing criterion; and if the first, relative metrics between the target signal and the at least one residual signal at the determined current time instant or time slot is smaller than the predetermined relative threshold, then the determined current time instant or time slot is associated to the second remixing criterion, wherein:

the first remixing criterion adopts a first ratio between:

the rough remixing gain associated to the target signal; and the rough remixing gain associated to the input signal, or the at least one residual signal;

the second remixing criterion adopts a second ratio between:

the rough remixing gain associated to the target signal;

the rough remixing gain associated to the input signal or the at least one residual signal, wherein the second ratio is higher than the first ratio, wherein the deviation comprises gradually moving the ratio between the remixing gain associated to the target signal and the remixing gain associated to the at least one residual signal or the input signal, from the first ratio to the second ratio, or vice versa.

13. The system of claim 5, wherein the at least one criterion condition comprises a condition on at least an absolute metrics at the determined current time instant or time slot, so that:

if the absolute metrics on the target signal at the determined current time instant or time slot is smaller than a predetermined absolute threshold, then the determined current time instant or time slot is associated to the first remixing criterion; and if the absolute metrics on the target signal at the determined current time instant or time slot is greater than the predetermined absolute threshold, then the determined current time instant or time slot is associated to the second remixing criterion, wherein:

the first remixing criterion adopts a first ratio between:

the rough remixing gain associated to the target signal; and the rough remixing gain associated to the input signal, or the at least one residual signal;

the second remixing criterion adopts a second ratio between:

the rough remixing gain associated to the target signal;

the rough remixing gain associated to the input signal, or the at least one residual signal, wherein the second ratio is higher than the first ratio, wherein the deviation comprises gradually moving the ratio between the remixing gain associated to the target signal, and the remixing gain associated to the at least one residual signal or the input signal, from the first ratio to the second ratio, or vice versa.

14. The system of claim 5, wherein the deviation condition is not fulfilled at least when the rough remixing gain associated to the determined current time instant or slot is associated to a remixing criterion different from the remixing criterion associated to the time instant or time slot of the discrete succession of time instants or time slots preceding the current determined time instant or time slot, and in that case the at least one remixing gain for the determined current time instant or time slot is maintained the same of the at least one remixing gain for a time instant or time slot of the discrete succession of time instants or time slots preceding the determined current time instant or time slot.

15. The system of claim 5, configured to distinguish, based on the first, relative metrics on the target signal in the at least one determined current time instant, and on the temporal context information, between transitory time interval and non-transitory time intervals, so as to:

in the non-transitory time interval, assign the value of the at least one rough remixing gain according to the current remixing criterion to the at least one remixing gain; and to deviate from the at least one rough remixing gain according to the current remixing criterion in the transitory time intervals.

16. The system of claim 5, configured to associate, to the target signal, an activity information for each time instant or time slot of the discrete succession of time instants or time slots which acknowledges whether, for each time instant or time slot of the discrete succession of time instants or time slots, target signal, is active or non-active based on the metrics in each time instant or time slot of the discrete succession of time instants or time slots, wherein the at least one criterion condition keeps into account the activity information.

17. The system of claim 16, wherein the activity information is active for:

time instants or time slots of the discrete succession of time instants or time slots for which the absolute metrics, associated to a level or loudness of the target signal as being greater than an absolute predefined threshold and/or the first, relative metrics, comparing the target signal with the at least one residual signal or input signal is greater than a relative predefined threshold.

18. The system of claim 17, wherein the activity information is additionally active for:

time instants or time slots of the discrete succession of time instants or time slots within a time window in which the time instants or time slots of the discrete succession of time instants or time slots comprise the absolute metrics, associated to a level or loudness of the target signal smaller than the absolute predefined threshold and/or the first, relative metrics, comparing the target signal with the at least one residual signal or input signal is smaller than the relative predefined threshold, but the time window has length smaller than a predetermined time threshold.

19. The system of claim 18, wherein the activity information is negative for:

time instants or time slots of the discrete succession of time instants or time slots within a time window in which the time instants or time slots of the discrete succession of time instants or time slots comprise the absolute metrics, associated to a level or loudness of the target signal smaller than the absolute predefined threshold and/or the first, relative metrics, comparing the target signal with the at least one residual signal or input signal is smaller than the relative predefined threshold, and the time window has length greater than the predetermined time threshold.

20. The system of claim 5, configured to define the at least one gain for a plurality of consecutive time instants or time samples to gradually deviating from the first remixing criterion towards the second remixing criterion.

21. The system of claim 1, configured to perform, for the determined current time instant or time slot, a time averaging on a plurality of time instants or time slots of the discrete succession of time instants or time slots which precede and/or follow the determined time instant, so as to obtain an average of the at least one metrics along the plurality of time instants or time slots of the discrete succession of time instants or time slots.

22. The system of claim 1, configured to shift the at least one gain as obtained for each time instant or time step of the discrete succession of time instants or time slots by a predetermined number of time instants or time steps towards the past.

23. The system of claim 1, further comprising a remixing block configured to apply, for the determined current time instant or time slot, the at least one gain and the at least one residual signal.

24. The system of claim 1, wherein the at least one remixing gain comprises different remixing gains for different frequency bands.

25. The system of claim 24, wherein the first, relative metrics in the determined current time instant or time slot and the second, relative metrics in the at least one future and/or past time instant or time slot is subdivided onto metrics for different frequency bands, so as to obtain the different remixing gains for different frequency bands.

26. The system of claim 1, wherein the first, relative metrics in the determined current time instant or time slot and the second, relative metrics for the at least one future and/or past time instant or time slot, is weighted according to weighting coefficients which vary according to the frequency.

27. The system of claim 1, configured to encode a bitstream encoding the target signal and the at least one residual signal or input signal and the at least one gain.

28. A method for processing audio signals, comprising:

a source separation step obtaining, from an input signal evolving in time along a discrete succession of time instants or time slots, a target signal and at least one residual signal to be subsequently remixed according to at least one remixing gain variable along the discrete succession;

a control step determining, for a determined current time instant or time slot, a first, relative metrics in the determined current time instant or time slot, wherein the first, relative metrics compares a level of the target signal with a level of the input signal, or the at least one residual signal, in the determined current time instant or time slot; and a temporal context step determining temporal context information based on a second, relative metrics in at least one future and/or past time instant or time slot, the second, relative metrics comparing a level of the target signal with a level of the input signal or the at least one residual signal in the at least one future and/or past time instant or time slot, the at least one future time instant or time slot being, in the discrete succession, after the determined current time instant or time slot, and the past time instant or time slot being, in the discrete succession, before the determined current time instant or time slot, the method comprising generating at least one remixing gain based on:

the first, relative metrics in the determined current time instant or time slot; and the temporal context information.

29. A non-transitory digital storage medium having a computer program stored thereon to perform the method for processing audio signals, the method comprising:

a source separation step obtaining, from an input signal evolving in time along a discrete succession of time instants or time slots, a target signal and at least one residual signal to be subsequently remixed according to at least one remixing gain variable along the discrete succession;

a control step determining, for a determined current time instant or time slot, a first, relative metrics in the determined current time instant or time slot, wherein the first, relative metrics compares a level of the target signal with a level of the input signal, or the at least one residual signal, in the determined current time instant or time slot; and a temporal context step determining temporal context information based on a second, relative metrics in at least one future and/or past time instant or time slot, the second, relative metrics comparing a level of the target signal with a level of the input signal or the at least one residual signal in the at least one future and/or past time instant or time slot, the at least one future time instant or time slot being, in the discrete succession, after the determined current time instant or time slot, and the past time instant or time slot being, in the discrete succession, before the determined current time instant or time slot, the method comprising generating at least one remixing gain based on:

the first, relative metrics in the determined current time instant or time slot; and the temporal context information, when said computer program is run by a computer.

* * * * *